US012593077B2

(12) United States Patent
Pan et al.

(10) Patent No.: US 12,593,077 B2
(45) Date of Patent: Mar. 31, 2026

(54) MEDIA STREAM SWITCHING METHOD AND APPARATUS

(71) Applicant: HUAWEI TECHNOLOGIES CO., LTD., Shenzhen (CN)

(72) Inventors: Qi Pan, Beijing (CN); Zhenglei Huang, Shenzhen (CN); Hui Ni, Beijing (CN); Yaxin Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 464 days.

(21) Appl. No.: 18/158,011

(22) Filed: Jan. 23, 2023

(65) Prior Publication Data

US 2023/0156247 A1     May 18, 2023

Related U.S. Application Data

(63) Continuation of application No. PCT/CN2021/108484, filed on Jul. 26, 2021.

(30) Foreign Application Priority Data

Jul. 28, 2020     (CN) .......................... 202010739547.9

(51) Int. Cl.
*H04N 21/2187*          (2011.01)
*H04L 12/54*            (2022.01)
*H04L 65/1069*          (2022.01)

(52) U.S. Cl.
CPC ......... *H04N 21/2187* (2013.01); *H04L 12/56* (2013.01); *H04L 65/1069* (2013.01)

(58) Field of Classification Search
CPC ......... H04N 21/2187; H04N 21/21805; H04N 21/231; H04N 21/44016; H04N 21/6131;
(Continued)

(56) References Cited

U.S. PATENT DOCUMENTS 9,451,003 B1      9/2016   Bertz et al.
9,876,831 B1 *    1/2018   Leske .................. G06Q 10/107
(Continued)

FOREIGN PATENT DOCUMENTS

CN        101132521 A       2/2008
CN        101552800 A      10/2009
(Continued)

OTHER PUBLICATIONS

3GPP TS 23.501 V15.10.0:"3rd Generation Partnership Project; Technical Specification Group Services and System Aspects;System architecture for the 5G System (5GS);Stage 2(Release 15)",Jul. 2020,total 249 pages.
(Continued)

*Primary Examiner* — Shean Tokuta
(74) *Attorney, Agent, or Firm* — WOMBLE BOND DICKINSON (US) LLP

(57)                ABSTRACT

An access network device receives characteristic information of a first live media stream included in a switching request from a terminal device. The access network device or a user plane network element determines, based on the characteristic information, the first live media stream corresponding to the characteristic information of the first live media stream. Therefore, the access network device or the user plane network element switches a media stream sent to the terminal device, to be specific, switches the live media stream sent to the terminal device from a second live media stream to the first live media. Both the second live media stream and the first live media stream correspond to the access network device or the user plane network element. According to the method, media stream switching can be completed on the access network device side or the user plane network element side.

18 Claims, 12 Drawing Sheets

(58) Field of Classification Search

CPC .......... H04N 21/6181; H04N 21/6373; H04N 21/6377; H04N 21/6379; H04N 21/64322; H04N 21/6587; H04L 12/56; H04L 65/1069; H04L 65/611; H04L 65/80; H04L 65/765

See application file for complete search history.

(56) References Cited

U.S. PATENT DOCUMENTS

| | | | | |
|---|---|---|---|---|
| 10,999,346 | B1 * | 5/2021 | Yang | H04L 65/80 |
| 11,509,942 | B2 * | 11/2022 | Evans | H04N 21/44213 |
| 2012/0173749 | A1 * | 7/2012 | Shah | H04L 65/765 |
| | | | | 709/231 |
| 2012/0324519 | A1 * | 12/2012 | Laughlin | H04N 21/23439 |
| | | | | 725/95 |
| 2014/0028067 | A1 | 1/2014 | Wan | |
| 2014/0050082 | A1 * | 2/2014 | Sun | H04L 65/752 |
| | | | | 370/230 |
| 2015/0033008 | A1 * | 1/2015 | Einarsson | H04L 65/80 |
| | | | | 713/150 |
| 2016/0119395 | A1 | 4/2016 | Li et al. | |
| 2018/0014037 | A1 * | 1/2018 | Venkatraman | H04N 21/4532 |
| 2019/0028743 | A1 | 1/2019 | He et al. | |
| 2020/0202619 | A1 * | 6/2020 | Sheng | G06T 19/20 |
| 2020/0260144 | A1 * | 8/2020 | Salisbury | H04N 21/23439 |
| 2021/0154576 | A1 * | 5/2021 | Bhattacharyya | A63F 13/355 |
| 2023/0117444 | A1 * | 4/2023 | Gunnalan | H04L 65/80 |
| | | | | 709/231 |
| 2023/0156247 | A1 * | 5/2023 | Pan | H04N 21/64322 |
| | | | | 375/240.26 |

FOREIGN PATENT DOCUMENTS

| | | | | | |
|---|---|---|---|---|---|
| CN | 101594238 | A | | 12/2009 | |
| CN | 101873263 | A | | 10/2010 | |
| CN | 102231848 | A | | 11/2011 | |
| CN | 103763609 | A | | 4/2014 | |
| CN | 106303704 | A | | 1/2017 | |
| CN | 106331895 | A | | 1/2017 | |
| CN | 107566855 | A | | 1/2018 | |
| CN | 107872424 | A | | 4/2018 | |
| CN | 108156467 | A | | 6/2018 | |
| CN | 109104614 | A | | 12/2018 | |
| CN | 109525802 | A | * | 3/2019 | H04L 65/75 |
| CN | 111083511 | A | * | 4/2020 | H04N 21/2747 |
| CN | 111510757 | A | * | 8/2020 | G06F 3/013 |
| CN | 111835697 | A | * | 10/2020 | H04L 65/752 |
| CN | 114007087 | A | * | 2/2022 | H04L 65/80 |
| EP | 2938038 | A1 | * | 10/2015 | H04N 5/222 |
| EP | 3968647 | A1 | * | 3/2022 | H04L 65/613 |
| JP | 2015523017 | A | | 8/2015 | |
| JP | 2019527497 | A | * | 9/2019 | H04N 21/64738 |
| JP | 2020537454 | A | | 12/2020 | |
| WO | WO-2018027237 | A1 | * | 2/2018 | H04N 21/2187 |
| WO | WO-2019096063 | A1 | * | 5/2019 | H04L 65/40 |
| WO | WO-2022022471 | A1 | * | 2/2022 | H04L 65/80 |
| WO | WO-2022088833 | A1 | * | 5/2022 | H04L 5/0055 |
| WO | WO-2023185769 | A1 | * | 10/2023 | H04W 28/24 |

OTHER PUBLICATIONS

3GPP TR 26.928 V1.2.0:"3rd Generation Partnership Project; Technical Specification Group Services and System Aspects; Extended Reality (XR) in 5G (Release 16)",3GPP Draft; S4-200213,Jan. 24, 2020, XP051845254, total 125 pages.

3GPP Draft; 23.757 V0.4.0,"3rd Generation Partnership Project; Technical Specification Group Services and System Aspects; Study on architectural enhancements for 5G multicast-broadcast services (Release 17)", Jun. 22, 2020, XP051903807, total 157 pages.

Kourtis Michail-Alexandros et al:"A Cloud-Enabled Small Cell Architecture in 5G Networks for Broadcast Multicast Services", Jun. 1, 2019,pp. 414-424, XP011727937.

* cited by examiner

MEDIA STREAM SWITCHING METHOD AND APPARATUS

CROSS-REFERENCE TO RELATED APPLICATIONS

This application is a continuation of International Application No. PCT/CN2021/108484, filed on Jul. 26, 2021, which claims priority to Chinese Patent Application No. 202010739547.9, filed on Jul. 28, 2020. The disclosures of the aforementioned applications are hereby incorporated by reference in their entireties.

TECHNICAL FIELD

This application relates to the field of communication technologies, and in particular, to a media stream switching method and an apparatus.

BACKGROUND

Currently, the new media industry is developing rapidly. Users can use live streaming application clients (for example, TikTok®, Kuaishou®, Taobao Live®) installed on terminals such as mobile phones and tablets to watch live videos. When a user watches a video, a live streaming application client on a terminal may request a live media stream with an appropriate bit rate or resolution from an application server based on a video image quality requirement of the user. For a virtual reality (VR) panoramic video, a live streaming application client on a terminal may further request a suitable live media stream for a field of view from an application server based on a current field of view of a user. Because there is a delay in a network transmission process, it is difficult for a live streaming application client on a terminal to send, to an application server side in a timely manner, parameter information (such as a bit rate value, a resolution value, or a field of view) of a media stream requested to be switched by the terminal. As a result, a media stream switching delay is excessively long, a live video freezes, and user's live video watching experience is severely affected.

SUMMARY

This application provides a media stream switching method and an apparatus, to determine a live media stream corresponding to characteristic information based on the characteristic information of the live media stream in a switching request sent by a terminal device, and distribute the live media stream to the terminal device in a timely manner, so that a media stream switching delay is reduced.

According to a first aspect, an embodiment of this application provides a communication method. The method is applicable to an access network device.

The access network device receives characteristic information of a first live media stream included in a switching request from a terminal device. The access network device determines, based on the characteristic information, the first live media stream corresponding to the characteristic information of the first live media stream. Therefore, the access network device switches a media stream sent to the terminal device, to be specific, switches the live media stream sent to the terminal device from a second live media stream to the first live media, where both the second live media stream and the first live media stream correspond to the access network device.

In an embodiment of this application, if a plurality of users served by a same access network device access a same live media stream, the access network device in this method embodiment is entitled to perform switching, to help switch a media stream in a timely manner and reduce a media stream switching delay.

In an embodiment, the access network device determines first address information corresponding to the first live media stream. Then, the access network device sends the first address information to the terminal device, where the first address information is used for binding to second address information corresponding to the second live media stream. In another embodiment, the access network device determines first address information corresponding to the first live media stream and second address information corresponding to the second live media stream. The access network device replaces the first address information in a data packet that carries the first live media stream with the second address information. It should be noted that address information may refer to at least one of IP and port information.

In an embodiment of this application, the access network device sends, to the terminal device side, IP/port information corresponding to the characteristic information requested by the terminal device, to ensure that the terminal device side can bind the IP/port information to original IP/port information, and parse and apply corresponding data after receiving the corresponding data.

In an embodiment, the access network device receives a message from a session management function network element or a user plane function network element, where the message includes the first address information corresponding to the first live media stream. The access network device determines, based on the message, the first address information and the second address information corresponding to the first live media stream.

In an embodiment of this application, the session management function network element sends corresponding address information to the access network device, or the user plane management function network element directly sends address information to the access network device.

In an embodiment, a manner in which the access network device determines the first live media stream corresponding to the characteristic information of the first live media stream may be as follows. The access network device determines, based on the characteristic information of the first live media stream, that a second active characteristic information set including characteristic information of a live media stream of at least one terminal device served by the access network device includes the characteristic information of the first live media stream. The access network device determines, in monitored live media streams, the first live media stream that carries the characteristic information of the first live media stream.

In an embodiment of this application, the access network device may monitor a media stream served by the access network device, to determine a media stream that is being accessed by the terminal device in a service range of the current access network device. Therefore, the corresponding first live media stream may be determined based on the characteristic information.

In an embodiment, the access network device determines, based on the characteristic information of the first live media stream, that the second active characteristic information set does not include the characteristic information of the first live media stream. Therefore, the access network device sends response information to the terminal device, where the response message is for notifying the terminal device that live media stream switching fails. In this way, after receiving the response message, the terminal device resends the switching request to an application server. In an embodiment, the application server may be an edge application server or a central application server. The edge application server is closer to the terminal device than the central application server. The edge application server may also be referred to as a local application server. The central application server may also be referred to as a remote application server.

In an embodiment of this application, when determining that the first live media stream does not exist currently, the access network device may send the response message to the terminal device in a timely manner, to avoid long-time freezing on the terminal device caused by a switching failure.

In an embodiment, the access network device determines, based on the characteristic information of the first live media stream, that the second active characteristic information set does not include the characteristic information of the first live media stream. Therefore, the access network device sends the characteristic information of the first live media stream to an application server via the user plane function network element, that is, requests the first live media stream from the application server.

In an embodiment of this application, when determining that the first live media stream does not exist currently, the access network device may request the first live media stream from the application server in a timely manner, to avoid long-time freezing on the terminal device caused by a switching failure.

In an embodiment, the second active characteristic information may be generated in the following manner. The access network device sends an establishment request message of a live session of the terminal device to a session management function network element. The access network device receives an establishment complete message of the live session and second indication information from the session management function network element. The access network device monitors, based on the second indication information, the live media stream of the at least one terminal device served by the access network device, and creates the second active characteristic information set.

In an embodiment, the access network device may further send the second active characteristic information set to the terminal device. Therefore, the terminal device may first determine, before sending the switching request, whether the characteristic information of the first live media stream requested to be switched exists in the second active characteristic information set. If the characteristic information of the first live media stream exists in the second active characteristic information set, the terminal device sends the switching request to the access network device. If the characteristic information of the first live media stream does not exist in the second active characteristic information set, the terminal device sends the switching request to the application server.

In an embodiment of this application, the access network device may generate the second active characteristic information set based on a GTP layer indication, and send the second active characteristic information set to the terminal device via an RRC message or a PDCP layer extension identifier. When the terminal device side performs media stream switching, the access network device side directly duplicates/forwards a media stream corresponding to characteristic information to a DRB corresponding to the terminal device, to complete the media stream switching.

In an embodiment, the characteristic information of the first live media stream is a media stream parameter value of the first live media stream, or an index value uniquely corresponding to the first live media stream, and the media stream parameter value includes a value of at least one type of parameter of a bit rate, a resolution, a frame rate, or a field of view.

According to a second aspect, an embodiment of this application provides a media stream switching method. The method is applicable to a terminal device. The terminal device sends characteristic information of a first live media stream to an access network device. The terminal device switches a live media stream received from the access network device from a second live media stream to the first live media stream, where the first live media stream corresponds to the characteristic information of the first live media stream, and both the second live media stream and the first live media stream correspond to the access network device.

In an embodiment of this application, if a plurality of users served by a same access network device or a same user plane function network element access a same live media stream, the access network device or the user plane function network element in this method embodiment is entitled to perform switching, to help switch a media stream in a timely manner and reduce a media stream switching delay.

In an embodiment, before the terminal device sends the characteristic information of the first live media stream to the access network device, the terminal device sends an establishment request message of a live session to a session management function network element via the access network device. The terminal device receives, from the session management function network element via the access network device, an establishment request complete message and an initial characteristic information set for a live service, where the initial characteristic information set includes characteristic information of live media streams corresponding to various media stream parameters. The terminal device determines, in the initial characteristic information set, the characteristic information of the first live media stream corresponding to current media stream parameter information.

In this embodiment of this application, in a process of establishing a PDU session, delivery of characteristic information of a live media stream is completed, to ensure media stream switching.

In an embodiment, before the terminal device sends the characteristic information of the first live media stream to the access network device, the terminal device receives a second active characteristic information set from the access network device. The terminal device determines that the second active characteristic information set includes the characteristic information of the first live media stream. The second active characteristic information set includes characteristic information of a live media stream of at least one terminal device served by the access network device.

In this embodiment of this application, the terminal device views the second active characteristic information set. If characteristic information corresponding to a requested media stream is not in the second active characteristic information set, the terminal device requests the live media stream corresponding to the characteristic information via an existing application layer interaction process. If characteristic information corresponding to a requested media stream is in the second active characteristic information set, the terminal device directly sends a live media stream request corresponding to the characteristic information to the access network device.

In an embodiment, the terminal device further receives a first active characteristic information set from the user plane function network element. The first active characteristic information set includes a characteristic information set of a live media stream of at least one terminal device served by the user plane function network element. When the terminal device determines that the first active characteristic information set includes the characteristic information of the first live media stream, the terminal device sends a switching request to the user plane function network element via the access network device. When the terminal device determines that the first active characteristic information set does not include the characteristic information of the first live media stream, the terminal device sends a switching request to an application server. In an embodiment, the application server may be an edge application server or a central application server. The edge application server is closer to the terminal device than the central application server. The edge application server may also be referred to as a local application server. The central application server may also be referred to as a remote application server.

In this embodiment of this application, the terminal device views the first active characteristic information set. If characteristic information corresponding to a requested media stream is not in the second active characteristic information set, the terminal device requests the live media stream corresponding to the characteristic information via an existing application layer interaction process. If characteristic information corresponding to a requested media stream is in the first active characteristic information set, the terminal device directly sends a live media stream request corresponding to the characteristic information to the user plane function network element.

In an embodiment, the terminal device further receives first address information corresponding to the first live media stream. The terminal device binds the first address information corresponding to the first live media stream to second address information corresponding to the second live media stream, and parses the first live media stream based on a binding relationship.

In this embodiment of this application, the access network device sends, to the terminal device side, IP/port information corresponding to the characteristic information requested by the terminal device, to ensure that the terminal device side can bind the IP/port information to original IP/port information, and parse and apply corresponding data after receiving the corresponding data.

According to a third aspect, an embodiment of this application further provides a media stream switching method. The method is applicable to a user plane function network element. The method includes:

The user plane function network element receives characteristic information of a first live media stream from a terminal device. The user plane function network element determines the first live media stream corresponding to the characteristic information of the first live media stream. The user plane function network element switches a live media stream sent to the terminal device from a second live media stream to the first live media stream, where both the second live media stream and the first live media stream correspond to the user plane function network element.

In this embodiment of this application, if a plurality of users served by a same user plane function network element access a same live media stream, the user plane function network element in this method embodiment is entitled to perform switching, to help switch a media stream in a timely manner and reduce a media stream switching delay.

In an embodiment, before the user plane function network element switches the live media stream sent to the terminal device from the second live media stream to the first live media stream, the user plane function network element determines first address information corresponding to the first live media stream and second address information corresponding to the second live media stream. The user plane function network element replaces the first address information in a data packet that carries the first live media stream with the second address information.

In this embodiment of this application, it is ensured that the terminal device side can parse and apply corresponding data by using original IP/port information.

In an embodiment, the user plane function network element determines first address information corresponding to the first live media stream. The user plane function network element sends the first address information to the terminal device, where the first address information is used for binding to second address information corresponding to the second live media stream.

In this embodiment of this application, the user plane function network element sends, to the terminal device side, IP/port information corresponding to the characteristic information requested by the terminal device, to ensure that the terminal device side can bind the IP/port information to original IP/port information, and parse and apply corresponding data after receiving the corresponding data.

In an embodiment, in determining the first live media stream corresponding to the characteristic information of the first live media stream, the user plane function network element determines that a first active characteristic information set includes the characteristic information of the first live media stream. The user plane function network element determines, in currently monitored live media streams, the first live media stream that carries the characteristic information of the first live media stream. The first active characteristic information set includes characteristic information of a live media stream of at least one terminal device served by the user plane function network element.

In this embodiment of this application, the user plane function network element may monitor a media stream served by the user plane function network element, to determine a media stream that is being accessed by the terminal device in a service range of the current user plane function network element. Therefore, the corresponding first live media stream may be determined based on the characteristic information.

In an embodiment, the user plane function network element determines that the first active characteristic information set does not include the characteristic information of the first live media stream. In this case, the user plane function network element sends a request message to an application server, where the request message includes the characteristic information of the first live media stream, and the request message is for requesting to switch the live media stream sent to the terminal device to the first live media stream. In an embodiment, the application server may be an edge application server or a central application server. The edge application server is closer to the terminal device than the central application server. The edge application server may also be referred to as a local application server. The central application server may also be referred to as a remote application server.

In this embodiment of this application, when determining that the first live media stream does not exist currently, the user plane function network element sends corresponding media request information to the application server in a timely manner, to ensure that the application server responds to media switching requested by the terminal device.

In an embodiment, the user plane function network element determines that the first active characteristic information set does not include the characteristic information of the first live media stream. The user plane function network element sends a response message to the terminal device via the access network device, where the response message is for notifying the terminal device that live media stream switching fails. In this way, after receiving the response message, the terminal device resends a switching request to the application server.

In this embodiment of this application, when determining that the first live media stream does not exist currently, the user plane function network element may send the response message to the terminal device in a timely manner, to avoid long-time freezing on the terminal device caused by a switching failure.

In an embodiment, before the user plane function network element receives the characteristic information of the first live media stream from the terminal device, the user plane function network element receives an establishment complete message of a live session and first indication information from a session management function network element. The user plane function network element monitors, based on the first indication information, the characteristic information of the live media stream of the at least one terminal device served by the user plane function network element, and creates the first active characteristic information set.

In this embodiment of this application, after a PDU session is established, the user plane function network element monitors characteristic information of a live media stream, and creates the first active characteristic information set, to ensure subsequent media stream switching.

In an embodiment, after detecting that the terminal device is accessing a live streaming service, the user plane function network element sends indication information to the session management network element, so that the session management network element notifies the application server of identity information of the user plane function network element and the terminal device, and the application server obtains the first active characteristic information set and sends the first active characteristic information set to the terminal device. Alternatively, in another possible design, the user plane function network element sends the first active characteristic information set to the terminal device.

In this embodiment of this application, in the foregoing manner, the user plane function network element may enable the application server to obtain the first active characteristic information set, so that the application server sends the first active characteristic information set to the terminal device. In this way, the terminal device may determine a media stream switching manner by viewing the first active characteristic information set.

In an embodiment, when the user plane function network element detects that characteristic information of live media streams of at least two terminal devices served by the user plane function network element is the same and that the live media streams are to be sent to a same access network device, the user plane function network element deduplicates the live media streams. The user plane function network element sends a live media stream obtained through deduplication to the access network device, where characteristic information of different live media streams in the live media streams obtained through deduplication is different from each other.

In this embodiment of this application, the user plane function network element transmits, based on the first active characteristic information set and an access network device corresponding to a media stream, a deduplicated media stream between the user plane function network element and the access network device, to reduce pressure on a transmission network and effectively ensure user's media watching experience.

In an embodiment, after detecting that the terminal device is accessing a live streaming service, the user plane function network element sends indication information and address information of the terminal device to the session management function network element, so that the session management function network element sends the indication information and the address information of the terminal device to the access network device. It should be noted that the address information may refer to at least one of IP and port information.

In this embodiment of this application, the session management function network element sends the IP/port information to the access network device, so that the access network device sends the IP/port information to the terminal device side, to ensure that the terminal device side can bind the IP/port information to original IP/port information, and parse and apply corresponding data after receiving the corresponding data.

According to a fourth aspect, an embodiment of this application further provides a media stream switching method. The method is applicable to a session management function network element. When establishing a live session of a terminal device, the session management function network element obtains an initial characteristic information set from a policy management function network element. The initial characteristic information set includes characteristic information of live media streams corresponding to various media stream parameters. After establishing the live session, the session management function network element sends first indication information to a user plane function network element, and sends the initial characteristic information set to the terminal device. The first indication information indicates to monitor characteristic information of a live media stream of at least one terminal device served by the user plane function network element.

In an embodiment, the session management function network element may further send third indication information to the terminal device. When receiving the third indication information, the terminal device sends characteristic information including a first live media stream according to the foregoing method.

In this embodiment of this application, in a process of establishing a PDU session, delivery of characteristic information of a live media stream is completed, to ensure media stream switching.

In an embodiment, after receiving indication information from the user plane function network element, the session management function network element sends identity information of the terminal device and identity information of the user plane function network element to an application server, so that the application server obtains a first active characteristic information set, and sends the first active characteristic information set to the terminal device. In an embodiment, the application server may be an edge application server or a central application server. The edge application server is closer to the terminal device than the central application server. The edge application server may also be referred to as a local application server. The central application server may also be referred to as a remote application server.

In this embodiment of this application, the terminal device may determine, by using the received first active characteristic information set, whether characteristic information of a requested media stream exists in the first active characteristic information set. If the characteristic information corresponding to the requested media stream is not in the first active characteristic information set, the terminal device requests the live media stream corresponding to the characteristic information via an existing application layer interaction process. If the characteristic information corresponding to the requested media stream is in the first active characteristic information set, the terminal device directly sends a live media stream request corresponding to the characteristic information to the user plane function network element.

According to a fifth aspect, an embodiment of this application further provides a media stream switching method. The method is applicable to an application server. The application server determines characteristic information of a live media stream corresponding to different media stream parameters. The application server sends an initial characteristic information set to a terminal, where the initial characteristic information set includes the characteristic information of the live media streams corresponding to various media stream parameters. In an embodiment, the application server may send the initial characteristic information set to the terminal device via an application layer message. In another possible embodiment, the application server may send the initial characteristic information set to a policy control function network element. In a session establishment process, a session management function network element obtains the initial characteristic information set from the policy control function network element, and sends the initial characteristic information set to the terminal device via a user plane function network element or an access network device.

In this embodiment of this application, the application server marks the live media stream by notifying the policy control function network element of the characteristic information of the live media stream corresponding to different media stream parameters.

In an embodiment, when the application server detects, based on a first active characteristic information set, that characteristic information of live media streams of at least two terminal devices is the same, the application server deduplicates the live media streams. The application server sends a live media stream obtained through deduplication to the user plane function network element, where characteristic information of different live media streams in the live media streams obtained through deduplication is different from each other.

In this embodiment of this application, a deduplicated media stream is transmitted between the application server and the user plane function network element, to reduce pressure on a backbone network and a transmission network, and effectively ensure user's media watching experience.

In an embodiment, the application server receives identity information of the user plane function network element and the terminal device from the session management network element; determines, based on the information, information about a live media stream accessed by the corresponding terminal device served by the corresponding user plane function network element; and may determine a first active characteristic information set on the user plane function network element.

In an embodiment, the application server obtains a first active characteristic information set from the user plane function network element. The application server sends the first active characteristic information set to the terminal device. The first active characteristic information set includes a characteristic information set of a live media stream of at least one terminal device served by the user plane function network element. Therefore, the terminal device may determine, based on the first active characteristic information set, characteristic information of a first live media stream to be switched to.

In this embodiment of this application, the terminal device further receives the first active characteristic information set from the application server. The first active characteristic information set includes the characteristic information set of the live media stream of the at least one terminal device served by the user plane function network element. When the terminal device determines that the first active characteristic information set includes the characteristic information of the first live media stream, the terminal device sends a switching request to the access network device. When the terminal device determines that the first active characteristic information set does not include the characteristic information of the first live media stream, the terminal device sends a switching request to the application server.

In an embodiment, the application server sends flow description information and media indicator information to the policy control function network element. The flow description information describes a live media stream data feature corresponding to a live service, and the media indicator information indicates a core network to perform corresponding optimization on a media service.

In an embodiment, the application server may be an edge application server or a central application server. The edge application server is closer to the terminal device than the central application server. The edge application server may also be referred to as a local application server. The central application server may also be referred to as a remote application server.

According to a sixth aspect, an embodiment of this application further provides a media stream switching method. The method is applicable to an edge application server, where the edge application server is a server closer to a terminal device than a central application server.

The edge application server receives characteristic information of a first live media stream from the terminal device. The edge application server determines the first live media stream corresponding to the characteristic information of the first live media stream. The edge application server switches a live media stream sent to the terminal device from a second live media stream to the first live media stream, where both the second live media stream and the first live media stream correspond to the edge application server.

In this embodiment of this application, if a plurality of users served by a same edge application server access a same live media stream, the edge application server in this method embodiment is entitled to perform switching, to help switch a media stream in a timely manner and reduce a media stream switching delay.

In an embodiment, before the edge application server switches the live media stream sent to the terminal device from the second live media stream to the first live media stream, the edge application server determines first address information corresponding to the first live media stream and second address information corresponding to the second live media stream. The edge application server replaces the first address information in a data packet that carries the first live media stream with the second address information.

In this embodiment of this application, it is ensured that the terminal device side can parse and apply corresponding data by using original IP/port information.

In an embodiment, that the edge application server determines the first live media stream corresponding to the characteristic information of the first live media stream includes: The edge application server determines that a first active characteristic information set includes the characteristic information of the first live media stream. The edge application server determines, in currently monitored live media streams, the first live media stream that carries the characteristic information of the first live media stream. The first active characteristic information set includes characteristic information of a live media stream of at least one terminal device served by the edge application server.

In this embodiment of this application, the edge application server may monitor a media stream served by the edge application server, to determine a media stream that is being accessed by the terminal device in a service range of the current edge application server. Therefore, the corresponding first live media stream may be determined based on the characteristic information.

In an embodiment, the edge application server determines that the first active characteristic information set does not include the characteristic information of the first live media stream. In this case, the edge application server sends a request message to the central application server, where the request message includes the characteristic information of the first live media stream, and the request message is for requesting to switch the live media stream sent to the terminal device to the first live media stream.

In this embodiment of this application, when determining that the first live media stream does not exist currently, the edge application server sends corresponding media request information to the central application server in a timely manner, to ensure that the central application server responds to media switching requested by the terminal device.

In an embodiment, the edge application server determines that the first active characteristic information set does not include the characteristic information of the first live media stream. The edge application server sends a response message to the terminal device via an access network device, where the response message is for notifying the terminal device that live media stream switching fails. In this way, after receiving the response message, the terminal device resends a switching request to the central application server.

In this embodiment of this application, when determining that the first live media stream does not exist currently, the edge application server may send the response message to the terminal device in a timely manner, to avoid long-time freezing on the terminal device caused by a switching failure.

According to a seventh aspect, this application provides a communication apparatus. The communication apparatus may be an access network device or a chip disposed in the access network device. The communication apparatus has a function of implementing the first aspect. For example, the communication apparatus includes a corresponding module, unit, or means (means) for performing the operations in the first aspect. The function, unit, or means may be implemented by software or hardware, or may be implemented by hardware executing corresponding software.

In an embodiment, the communication apparatus includes a processing unit and a communication unit. The communication unit may be configured to receive and send a signal, to implement communication between the communication apparatus and another apparatus. For example, the communication unit is configured to receive a switching request from a terminal device. The processing unit may be configured to perform some internal operations of the communication apparatus. Functions performed by the processing unit and the communication unit may correspond to the operations performed by the access network device in the foregoing aspects.

In an embodiment, the communication apparatus includes a processor, and may further include a transceiver. The transceiver is configured to receive and send a signal, and the processor executes program instructions to complete the method according to any one of the possible designs or embodiments of the first aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing a function in the first aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes a processor and a memory. The memory may store a computer program or instructions necessary for implementing a function in the first aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes at least one processor and an interface circuit. The at least one processor is configured to communicate with another apparatus through the interface circuit, and perform the method performed by the access network device according to any one of the possible designs or embodiments in the first aspect.

According to an eighth aspect, this application provides a communication apparatus. The communication apparatus may be a terminal device or a chip disposed in the terminal device. The communication apparatus has a function of implementing the second aspect. For example, the communication apparatus includes a corresponding module, unit, or means (means) for performing the operations in the second aspect. The function, unit, or means may be implemented by software or hardware, or may be implemented by hardware executing corresponding software.

In an embodiment, the communication apparatus includes a processing unit and a communication unit. The communication unit may be configured to receive and send a signal, to implement communication between the communication apparatus and another apparatus. For example, the communication unit is configured to receive a first live media stream sent by an access network. The processing unit may be configured to perform some internal operations of the communication apparatus. Functions performed by the processing unit and the communication unit may correspond to the operations performed by the access network device in the foregoing aspects.

In an embodiment, the communication apparatus includes a processor, and may further include a transceiver. The transceiver is configured to receive and send a signal, and the processor executes program instructions to complete the method according to any one of the possible designs or embodiments of the second aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing a function in the second aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes a processor and a memory. The memory may store a computer program or instructions necessary for implementing a function in the second aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes at least one processor and an interface circuit. The at least one processor is configured to communicate with another apparatus through the interface circuit, and perform the method performed by the terminal device according to any one of the possible designs or embodiments in the second aspect.

According to a ninth aspect, this application provides a communication apparatus. The communication apparatus may be a user plane function network element or a chip disposed in the user plane function network element. The communication apparatus has a function of implementing the third aspect. For example, the communication apparatus includes a corresponding module, unit, or means (means) for performing the operations in the third aspect. The function, unit, or means may be implemented by software or hardware, or may be implemented by hardware executing corresponding software.

In an embodiment, the communication apparatus includes a processing unit and a communication unit. The communication unit may be configured to receive and send a signal, to implement communication between the communication apparatus and another apparatus. For example, the communication unit is configured to receive a switching request sent by a terminal device. The processing unit may be configured to perform some internal operations of the communication apparatus. Functions performed by the processing unit and the communication unit may correspond to the operations performed by the access network device in the foregoing aspects.

In an embodiment, the communication apparatus includes a processor, and may further include a transceiver. The transceiver is configured to receive and send a signal, and the processor executes program instructions to complete the method according to any one of the possible designs or embodiments of the third aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing a function in the third aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes a processor and a memory. The memory may store a computer program or instructions necessary for implementing a function in the third aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes at least one processor and an interface circuit. The at least one processor is configured to communicate with another apparatus through the interface circuit, and perform the method performed by the user plane function network element according to any one of the possible designs or embodiments in the third aspect.

According to a tenth aspect, this application provides a communication apparatus. The communication apparatus may be a session management function network element or a chip disposed in the session management function network element. The communication apparatus has a function of implementing the fourth aspect. For example, the communication apparatus includes a corresponding module, unit, or means for performing the operations in the fourth aspect. The function, unit, or means may be implemented by software or hardware, or may be implemented by hardware executing corresponding software.

In an embodiment, the communication apparatus includes a processing unit and a communication unit. The communication unit may be configured to receive and send a signal, to implement communication between the communication apparatus and another apparatus. For example, the communication unit is configured to receive a session establishment request sent by a terminal device. The processing unit may be configured to perform some internal operations of the communication apparatus. Functions performed by the processing unit and the communication unit may correspond to the operations performed by the access network device in the foregoing aspects.

In an embodiment, the communication apparatus includes a processor, and may further include a transceiver. The transceiver is configured to receive and send a signal, and the processor executes program instructions to complete the method according to any one of the possible designs or embodiments of the fourth aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing a function in the fourth aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes a processor and a memory. The memory may store a computer program or instructions necessary for implementing a function in the fourth aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes at least one processor and an interface circuit. The at least one processor is configured to communicate with another apparatus through the interface circuit, and perform the method performed by the session management function network element according to any one of the possible designs or embodiments in the fourth aspect.

According to an eleventh aspect, this application provides a communication apparatus. The communication apparatus may be an application server or a chip disposed in the application server. The communication apparatus has a function of implementing the fifth aspect. For example, the communication apparatus includes a corresponding module, unit, or means (means) for performing the operations in the fifth aspect. The function, unit, or means may be implemented by software or hardware, or may be implemented by hardware executing corresponding software.

In an embodiment, the communication apparatus includes a processing unit and a communication unit. The communication unit may be configured to receive and send a signal, to implement communication between the communication apparatus and another apparatus. For example, the communication unit is configured to receive a session establishment request sent by an application server. The processing unit may be configured to perform some internal operations of the communication apparatus. Functions performed by the processing unit and the communication unit may correspond to the operations performed by the access network device in the foregoing aspects.

In an embodiment, the communication apparatus includes a processor, and may further include a transceiver. The transceiver is configured to receive and send a signal, and the processor executes program instructions to complete the method according to any one of the possible designs or embodiments of the fifth aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing a function in the fifth aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes a processor and a memory. The memory may store a computer program or instructions necessary for implementing a function in the fifth aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes at least one processor and an interface circuit. The at least one processor is configured to communicate with another apparatus through the interface circuit, and perform the method performed by the application server according to any one of the possible designs or embodiments in the fifth aspect.

According to a twelfth aspect, this application provides a communication apparatus. The communication apparatus may be an edge application server or a chip disposed in the edge application server. The communication apparatus has a function of implementing the sixth aspect. For example, the communication apparatus includes a corresponding module, unit, or means (means) for performing the operations in the sixth aspect. The function, unit, or means may be implemented by software or hardware, or may be implemented by hardware executing corresponding software.

In an embodiment, the communication apparatus includes a processing unit and a communication unit. The communication unit may be configured to receive and send a signal, to implement communication between the communication apparatus and another apparatus. For example, the communication unit is configured to receive a session establishment request sent by an edge application server. The processing unit may be configured to perform some internal operations of the communication apparatus. Functions performed by the processing unit and the communication unit may correspond to the operations performed by the access network device in the foregoing aspects.

In an embodiment, the communication apparatus includes a processor, and may further include a transceiver. The transceiver is configured to receive and send a signal, and the processor executes program instructions to complete the method according to any one of the possible designs or embodiments of the sixth aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing a function in the sixth aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes a processor and a memory. The memory may store a computer program or instructions necessary for implementing a function in the sixth aspect. The processor may execute the computer program or the instructions stored in the memory. When the computer program or the instructions are executed, the communication apparatus implements the method according to any one of the possible designs or embodiments of the access network device in the foregoing aspects.

In an embodiment, the communication apparatus includes at least one processor and an interface circuit. The at least one processor is configured to communicate with another apparatus through the interface circuit, and perform the method performed by the edge application server according to any one of the possible designs or embodiments in the sixth aspect.

According to a thirteenth aspect, this application provides a system, including the access network device, the user plane function network element, the application server, the session management function network element, and the terminal device in the foregoing method embodiments or apparatus embodiments. Optionally, the system further includes a unified data management function network element and a policy control function network element.

According to a fourteenth aspect, this application provides a system, including the access network device, the edge application server, the central application server, the session management function network element, and the terminal device in the foregoing method embodiments or apparatus embodiments. Optionally, the system further includes a unified data management function network element and a policy control function network element.

According to a fifteenth aspect, this application provides a computer-readable storage medium. The computer storage medium stores computer-readable instructions. When the computer-readable instructions are read and executed on a computer, the computer performs the method according to any one of the possible designs in the foregoing aspects.

According to a sixteenth aspect, this application provides a computer program product. When the computer program product is read and executed on a computer, the computer performs the method according to any one of the possible designs in the foregoing aspects.

According to a seventeenth aspect, this application provides a chip. The chip includes a processor. The processor is coupled to a memory, and is configured to read and execute a software program stored in the memory, to implement the method according to any one of the possible designs in the foregoing aspects.

DESCRIPTION OF EMBODIMENTS

Figure 1:
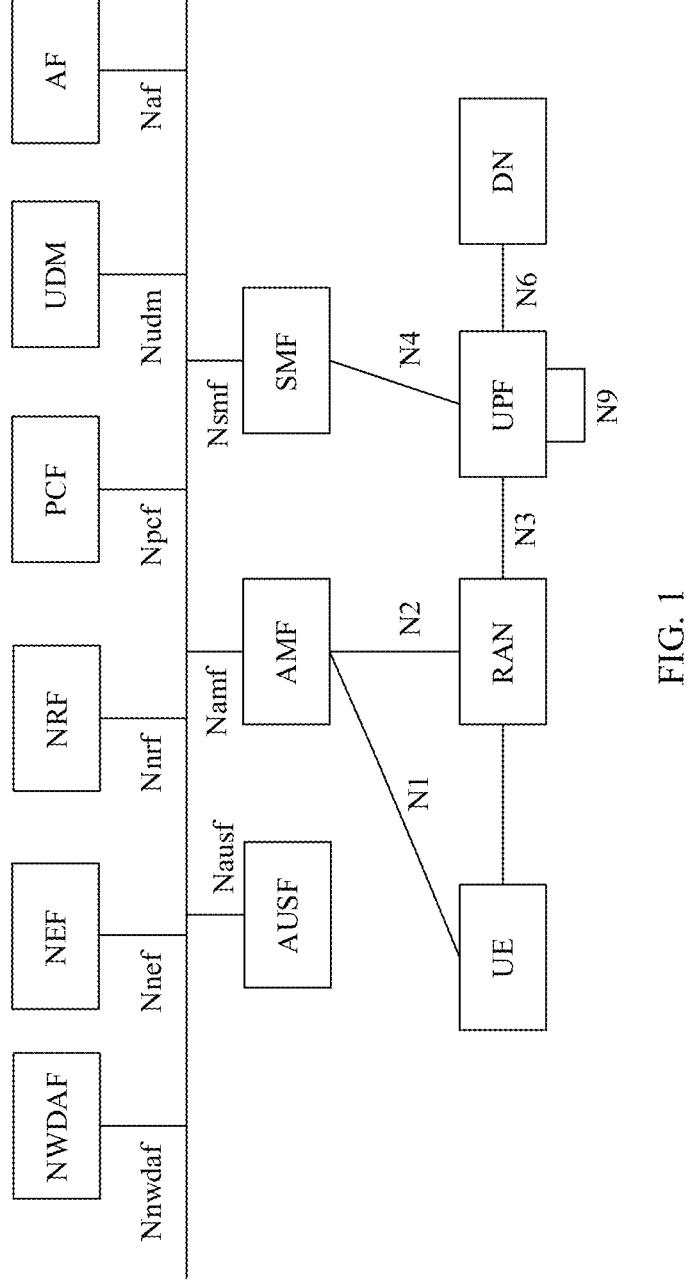
FIG. 1 is a schematic diagram of a network architecture according to an embodiment of this application.

It should be understood that, in embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "/" usually indicates an "or" relationship between the associated objects. "At least one of the following pieces (items)" or a similar expression thereof indicates any combination of these items, including a single item (piece) or any combination of a plurality of items (pieces). For example, at least one (piece) of a, b, or c may represent a, b, c, a and b, a and c, b and c, or a, b, and c, where each of a, b, and c may be an element, or may be a set including one or more elements.

In embodiments of this application, "example", "in some embodiments", "in another embodiment", and the like are used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, "of", "corresponding (relevant)", and "corresponding" may be used interchangeably sometimes. It should be noted that meanings expressed by the terms are consistent when differences are not emphasized. In embodiments of this application, communication and transmission may be used interchangeably sometimes. It should be noted that meanings expressed by the terms are consistent when differences are not emphasized. For example, transmitting may include sending and/or receiving, and may be in a noun form or a verb form.

It should be noted that, in embodiments of this application, terms such as "first" and "second" are only used for a purpose of distinction in description, and should not be understood as an indication or implication of relative importance or an indication or implication of a sequence.

A "network element" in embodiments of this application may also be referred to as a "device". This is not limited. The network element may be hardware, or may be software obtained through functional division, or a structure of a combination thereof. The network element may include a core network element, an access network element (which is also referred to as an access network device), and the like. The core network element includes, for example, a session management network element or a user plane network element.

For the problem raised in the Background, embodiments of this application provide a media stream switching method. An access network device determines a live media stream corresponding to characteristic information in a timely manner based on the characteristic information of the live media stream in a switching request sent by a terminal device, and distributes the live media stream corresponding to the characteristic information to the terminal device, to reduce a media stream switching delay. Compared with a conventional technology, after the access network device receives the switching request, if the live media stream corresponding to the characteristic information exists, the live media stream does not need to be obtained from an application server via a core network element, to reduce the media stream switching delay. A media stream obtained through switching can adapt to a network status change. Therefore, when a network condition is good, a user can watch a video with high image quality in real time on a terminal. When a network condition deteriorates, streaming media data with a low bit rate is transmitted. In this way, when the user watches a video in real time on the terminal, a possibility of video freeze is reduced, thereby helping improve user experience.

In the following, some terms in embodiments of this application are described, to help a person skilled in the art have a better understanding.

1. Media stream: A media stream may be understood as a video stream in embodiments of this application, and the video stream may include one or more video frames.

2. Media stream parameter: A media stream parameter in embodiments of this application may indicate definition of video frame image quality or a field of view. For example, the media stream parameter may be a field of view, a bit rate, a resolution, and/or a frame rate. For example, the bit rate depends on the resolution and the frame rate. For example, bit rate=frame rate*size of a video frame, where the size of the video frame depends on a resolution of the video frame and a used media coding technology. Therefore, there is usually a correspondence between a bit rate, a frame rate, and a resolution. For example, if the media stream parameter is the bit rate, the frame rate and the resolution are adjusted accordingly after adaptive network adjustment of the bit rate.

A higher bit rate indicates higher video quality. For example, image quality of a video with a bit rate of 10 Mbps is higher than that of a video with a bit rate of 5 Mbps. Usually, a higher bit rate indicates a higher requirement on a network bandwidth for transmitting streaming media data. For example, a network bandwidth required for transmitting streaming media data at a bit rate of 10 Mbps is greater than a network bandwidth required for transmitting streaming media data at a bit rate of 5 Mbps.

It should be understood that, in embodiments of this application, a media stream parameter identifier is used to indicate a size of a media stream parameter, in other words, identifiers of media stream parameters with different sizes are different. It should be noted that, when the media stream parameter is the bit rate, the media stream parameter identifier may also be referred to as a bit rate identifier. Similarly, when the media stream parameter is the resolution, the media stream parameter identifier may also be referred to as a resolution identifier. When the media stream parameter is the frame rate, the media stream parameter identifier may also be referred to as a frame rate identifier. For example, the media stream parameter is the resolution. For example, a resolution identifier of 360P is 000, a resolution identifier of 720P is 001, and a resolution identifier of 1080P is 010.

It should be noted that an access network device, a mobility management network element, a session management network element, a user plane network element, and a policy control network element are involved on a network side in performing the media stream switching method provided in this application. The access network device is an access network element. The mobility management network element, the session management network element, the user plane network element, and the policy control network element are core network elements. For example, the access network device is configured to provide a wireless communication function for a terminal. For example, the access network device is a radio access network (RAN) element. The mobility management network element is responsible for mobility management of the terminal. For example, the mobility management network element is a mobility management entity (MME) or an access and mobility management function (AMF) entity. The session management network element is configured to control establishment, modification, and deletion of a packet data unit (PDU) session. For example, the session management network element is a session management function (SMF) entity. The user plane network element is responsible for connecting to an external network (for example, a data network (DN). For example, the user plane network element is a user plane function (UPF) entity. The policy control network element is responsible for policy control, for example, generate a quality of service (QoS) parameter set. For example, the policy control network element is a policy control function (PCF) entity.

A terminal and an application server are involved in performing the media stream switching method provided in this application. It should be understood that in embodiments of this application, the terminal may also be referred to as a terminal device, user equipment (UE), a mobile terminal, a media client, or the like. This is not limited thereto. The application server may also be referred to as a media stream server or the like. This is not limited thereto. The application server may be an edge application server or a central application server. The edge application server is closer to the terminal device than the central application server. The edge application server may also be referred to as a local application server. The central application server may also be referred to as a remote application server. The following describes embodiments of this application by using UE and an application server as an example.

For example, FIG. 1 is a schematic diagram of a network architecture to which an embodiment of this application is applicable. The network architecture is a 5th generation mobile communication technology (5G) network architecture. The network architecture includes a RAN, an AMF network element, an SMF network element, a UPF network element, a PCF network element, a DN, and the like. In some embodiments, the network architecture further includes a unified data management function (UDM) entity, an authentication server function (AUSF) entity, an application function (AF) entity, a network exposure function (NEF) entity, a network data analytics function (NWDAF) entity, and the like.

A main function of the RAN (which may also be referred to as an access network (AN)) is to control UE to wirelessly access a mobile communication network. The RAN is a part of a mobile communication system. The RAN implements a radio access technology. For example, the RAN controls, via the RAN network element, UE to wirelessly access the mobile communication network, where the RAN is located between the UE and the core network element. The RAN network element, also referred to as an access network device, includes but is not limited to: a gNodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like. In addition, the RAN device may further include a wireless fidelity (Wi-Fi) access point (AP) and the like.

The AMF network element is responsible for UE access management and mobility management, including user registration management, reachability detection, SMF network element selection, mobility status switching management, and the like.

The SMF network element is mainly responsible for controlling PDU session establishment, modification, and deletion, UPF network element selection, and the like.

The UPF network element is mainly responsible for data packet routing and forwarding, provides support in routing a service flow to a data network via a mobility anchor point and an uplink classifier, supports a multi-homed PDU session via a branch point, and the like.

The PCF network element serves as a policy decision point, and is mainly responsible for providing rules such as a service data flow and application detection rule, a gating control rule, a QoS rule, and a flow-based charging control rule.

The UDM entity is mainly responsible for storing user subscription data.

The AUSF entity is mainly configured to provide an authentication service.

The AF entity is mainly configured to interact with a 3rd generation partnership project (3rd generation partnership project, 3GPP) core network to provide services, to influence service flow routing, access network capability exposure, policy control, and the like.

The NEF entity is mainly configured to securely expose a service and a capability provided by a 3GPP network function, such as a third party, edge computing, or an AF.

The DN provides a network service such as an operator service, internet access, or a third-party service for UE.

The NWDAF entity is mainly configured to provide functions such as network data collection and analysis based on technologies such as big data and artificial intelligence.

In addition, for brevity of description, in subsequent descriptions, the "entity" in each functional entity is omitted. For example, the AMF network element is referred to as an AMF for short, and the UPF network element is referred to as a UPF for short. This is similar for other entities, and is not enumerated one by one.

In FIG. 1, any two network elements among the NWDAF, the NEF, an NRF, the PCF, the UDM, the AF, the AUSF, the AMF, and the SMF may perform service-oriented communication with each other. For example, interfaces Nnef and Nausf used for communication between the NEF and the AUSF are service-oriented interfaces. Similarly, interfaces Nnwdaf, Nnrf, Npcf, Nudm, Naf, Namf, and Nsmf are service-oriented interfaces. In addition, the AMF may communicate with the UE through an N1 interface, the AMF may communicate with the RAN network element through an N2 interface, the RAN network element may communicate with the UPF through an N3 interface, the SMF may communicate with the UPF through an N4 interface, the UE communicates with the RAN network element through an air interface, the UPF may communicate with the DN through an N6 interface, and the UPFs communicate with each other through an N9 interface. It should be noted that the service-oriented interfaces between the network elements in FIG. 1 may alternatively be replaced with point-to-point interfaces.

In the network architecture shown in FIG. 1, network elements related to this application are mainly the RAN network element, the AMF network element, the SMF network element, the UPF network element, and the PCF network element.

It should be understood that the UE in this embodiment of this application is a device having a wireless transceiver function. The device may be deployed on land, and includes an indoor device, an outdoor device, a handheld device, or a vehicle-mounted device; or may be deployed on a water surface (for example, on a ship); or may be deployed in the air (for example, on an airplane, a balloon, or a satellite). For example, the UE may be a mobile phone, a tablet computer (pad), a smart screen, a computer having a wireless transceiver function, a virtual reality (VR) terminal device, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

It should be noted that FIG. 1 is merely an example of a network architecture to which an embodiment of this application is applicable, and does not constitute any limitation on embodiments of this application. Embodiments of this application may be alternatively applied to another network architecture, for example, a future mobile communication network architecture (for example, a 6G network architecture).

Figure 2A:
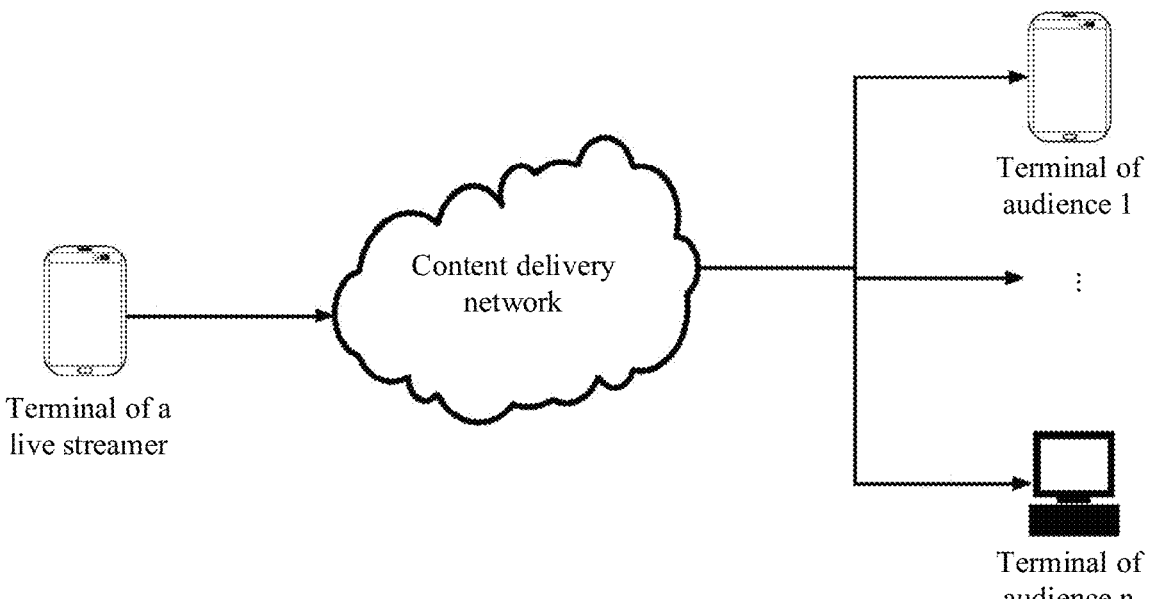
FIG. 2A is a schematic diagram of a live streaming system according to an embodiment of this application.

FIG. 2A is a schematic diagram of a live streaming system according to an embodiment of this application. Live streaming is a new way of social networking in which a plurality of users can watch or listen to same live content at the same time.

In an embodiment, as the new way of social networking, the live streaming has the following features. A user may perform an operation on a terminal, and the terminal may send a live streaming request to a server. The server creates a live streaming room for the user, where the live streaming room is an online virtual room that provides live audio and video streaming with on-screen comments. The user is an initiator of the live streaming room, namely, a live streamer. The live streamer may display audio and video content such as songs, games, movies, and TV series in the live streaming room. Another user, as an audience, may also enter the live streaming room via another terminal, and watch or listen to the content displayed by the live streamer in the live streaming room, or may interact with the live streamer, for example, like the live streamer, give a gift to the live streamer, follow or share the live streamer, or chat with the live streamer.

As shown in FIG. 1, the live streaming system may include a plurality of terminals and a content delivery network. The plurality of terminals may include a terminal of the live streamer and terminals of n audiences. The content delivery network is configured to provide audio and video services for the plurality of terminals. The terminal of the live streamer may collect audio and video data in a live streaming process of the live streamer, obtain a live media stream based on the audio and video data, and send the live media stream to the content delivery network. The content delivery network forwards the live media stream to the terminals of the n audiences. In this case, the terminals of the audiences may decode and play the live media stream, so that the audiences can watch the live content of the live streamer.

The terminal of the live streamer may perform live streaming on a live streaming application client on the terminal, or may perform live streaming on a portal website. Similarly, the terminals of the n audiences may also obtain the live media stream via the live streaming application or the portal website. This is not limited in embodiments of the present disclosure.

It should be noted that the live streaming system may further include a message relay and delivery server. The message relay and delivery server does not distinguish whether a terminal is the terminal of the audience or a terminal of the live streamer. The message relay and delivery server may broadcast a message sent by any terminal to other terminals. In this way, all terminals in the live streaming room can view the message, and the message usually includes interactive content between the audience and the live streamer. This embodiment of the present disclosure does not provide more details herein.

In addition, it should be noted that a live streaming scenario used in embodiments of this application is not limited to live streaming, and is further applicable to live broadcast of a sports game, live broadcast of a major news event, and the like. Examples are not described one by one herein.

Figure 2B:
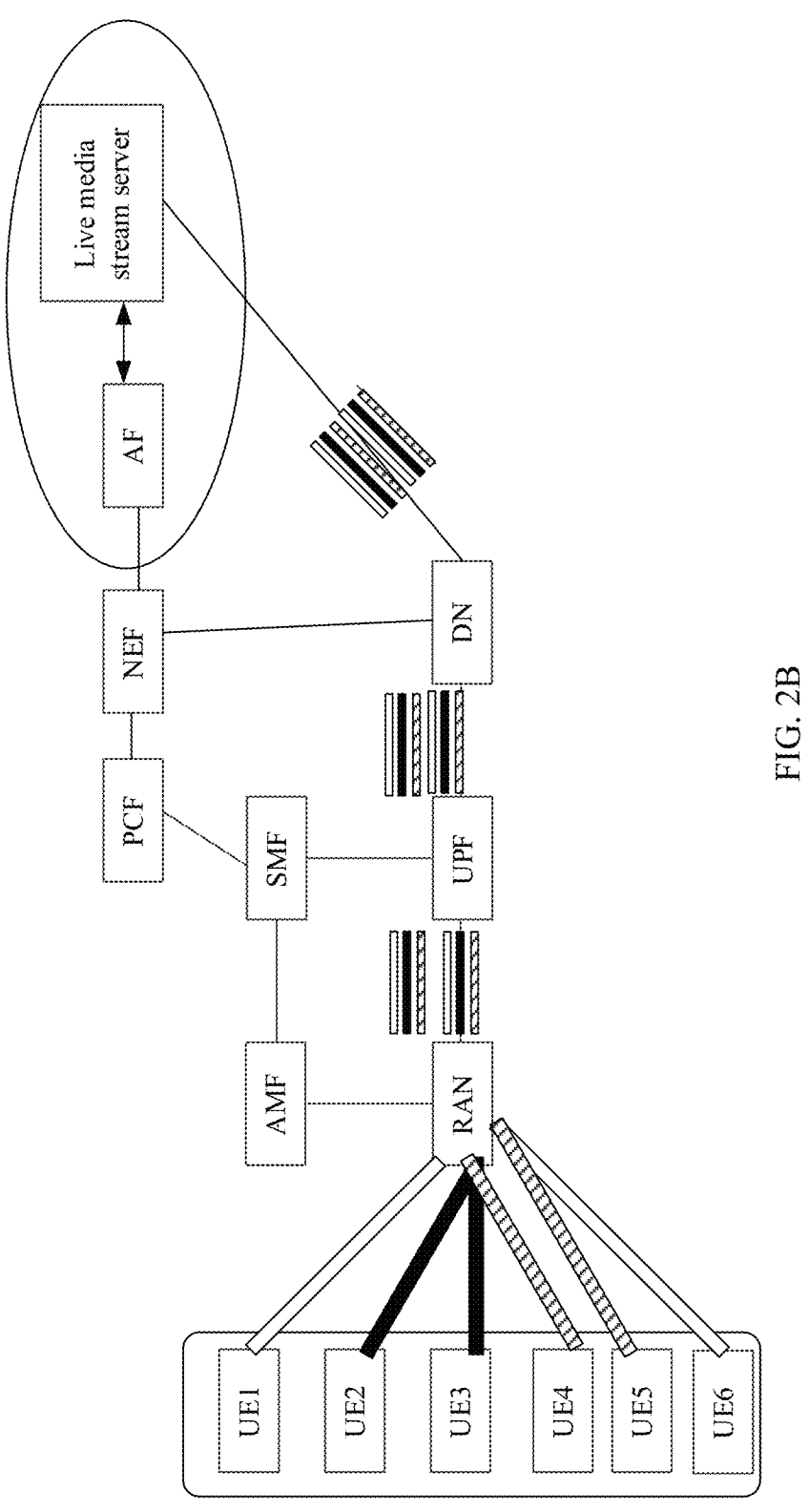
FIG. 2B is a schematic diagram of a network architecture corresponding to a current live streaming system according to an embodiment of this application.

FIG. 2B is a schematic diagram of a network architecture corresponding to a current live streaming system. The network architecture includes a radio access network (RAN), an AMF network element, an SMF network element, a UPF network element, a PCF network element, a DN, and the like shown in FIG. 1. For specific execution functions of each network element, refer to FIG. 1. Details are not described herein again.

In FIG. 2B, each UE separately establishes a data transmission channel with an application server of a live media stream, and independently requests and transmits live media stream data. For example, in FIG. 2B, six UEs (UE1, UE2, UE3, UE4, UE5, and UE6) respectively establish six data transmission channels with the application server of the live media stream. Same live media streams are transmitted through data transmission channels corresponding to UE1 and UE6. Same live media streams are transmitted through data transmission channels corresponding to UE2 and UE3. Same live media streams are transmitted through data transmission channels corresponding to UE4 and UE5. It can be learned that, currently, live media streams with same content are repeatedly transmitted via a core network element and an access network element. This greatly reduces resource utilization.

In addition, currently, in live media stream transmission, when UE switches a field of view or a bit rate, the UE needs to request a live media stream with the switched field of view or bit rate from an application server side. After receiving the request, the application server sends the switched live media stream to the UE. At present, due to a network delay in this process, a media stream switching delay is excessively long, and a live video freezes, which severely affects user's real time live video watching experience.

Therefore, this application provides a media stream switching method. According to the method, an access network element or a user plane network element may determine, based on characteristic information of a live media stream from a terminal device, a live media stream corresponding to the live media stream in a plurality of currently transmitted live media streams, and deliver a duplicated live media stream to the terminal device, to switch a media stream in a timely manner and improve a media stream switching delay. In addition, according to the method, deduplication transmission of a live media stream between an application server and the access network element is also implemented, thereby reducing transmission pressure between a core network element and the access network element, and improving resource utilization.

In the following embodiments provided in this application, the method provided in embodiments of this application is mainly described in detail with reference to the network architecture shown in FIG. 1. In the following, it is mainly assumed that a media stream parameter is a field of view. If the media stream parameter is another parameter such as a bit rate, a resolution, or a frame rate, for a session establishment method, a data transmission method, and a media stream switching method, refer to methods in which the media stream parameter is the field of view.

Embodiment 1

This embodiment is a process of establishing a session corresponding to a live service. The process aims to complete delivery of characteristic information of a live media stream in the session establishment process.

Figure 3:
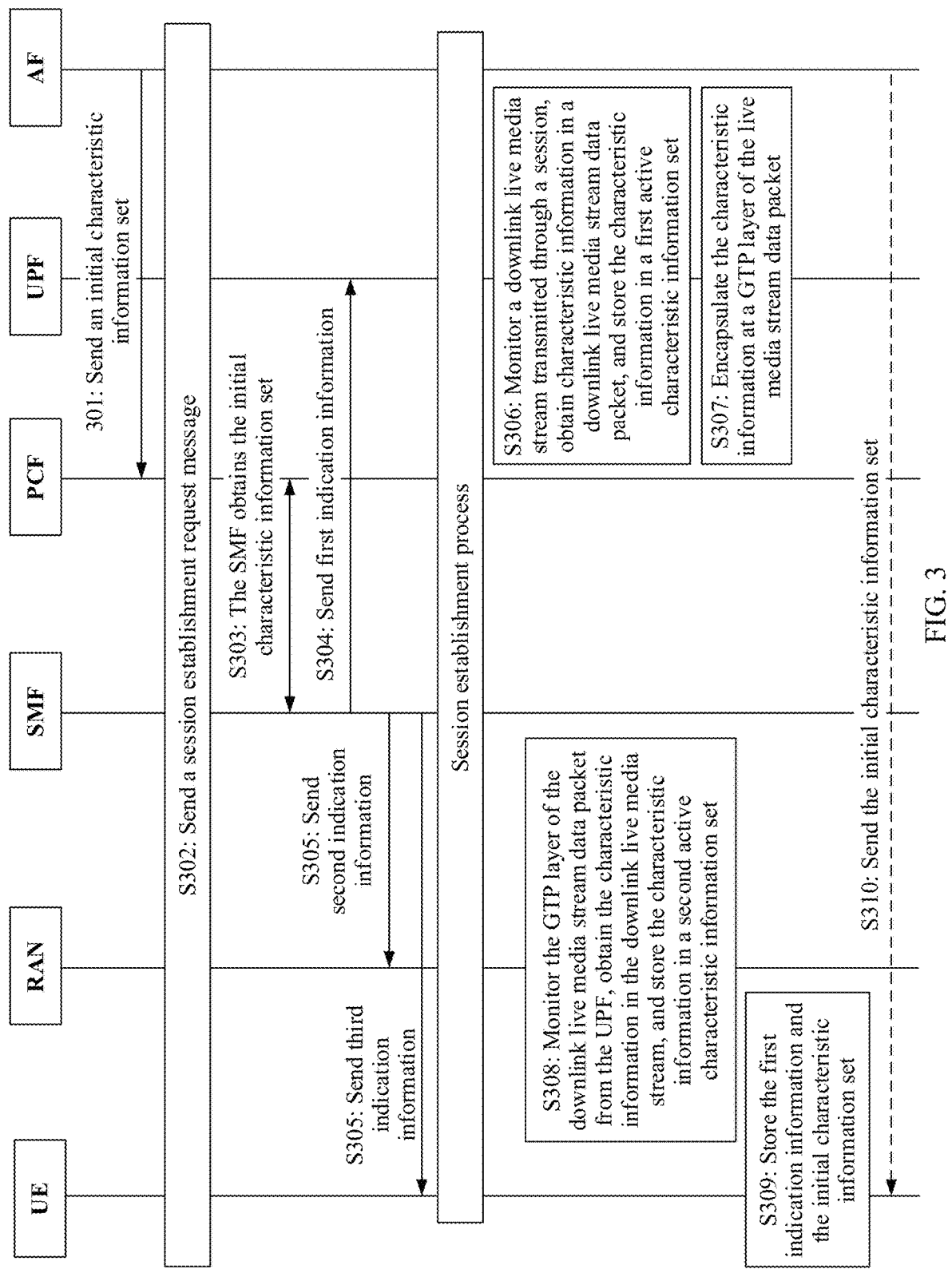
FIG. 3 is a schematic diagram of a session establishment method according to an embodiment of this application.

FIG. 3 shows a session establishment method according to an embodiment of this application. In an embodiment, the method includes the following operations.

Operation 301: An application server marks characteristic information of a live media stream, and sends an initial characteristic information set to a PCF. The initial characteristic information set includes characteristic information corresponding to each live media stream.

In an embodiment, the application server encapsulates the characteristic information in different live media stream data packets. Usually, the characteristic information is encapsulated at an IP layer of the live media stream data packet. The characteristic information may be a specific media stream parameter value or an index value.

Case 1: The characteristic information of the live media stream may be the media stream parameter value.

For example, a panoramic live media stream whose media stream parameter is a field of view is used as an example. Characteristic information of the panoramic live media stream marked by the application server may be a field of view degree value. For example, when the field of view is 0 degrees, the characteristic information encapsulated by the application server in a live media stream data packet is 0 degrees. When the field of view is 90 degrees, the characteristic information encapsulated by the application server in a live media stream data packet is 90 degrees. When the field of view is 360 degrees, the characteristic information encapsulated by the application server in a live media stream data packet is 360 degrees. The rest can be deduced by analogy. The application server may encapsulate a corresponding field of view degree value into each live media stream data packet corresponding to (0 degrees, 360 degrees). In this example, the initial characteristic information set may be a field of view degree list including 0 degrees to 180 degrees.

Case 2: The characteristic information of the live media stream may be an index value uniquely corresponding to each live media stream.

For example, a panoramic live media stream whose media stream parameter is a field of view is still used as an example. Characteristic information of the panoramic live media stream marked by the application server may be an index value. For example, when the field of view is 0 degrees, the index value encapsulated by the application server in a live media stream data packet is 0X00. When the field of view is 90 degrees, the index value encapsulated by the application server in a live media stream data packet is 0X5A. When the field of view is 360 degrees, the index value encapsulated by the application server in a live media stream data packet is 0168. The rest can be deduced by analogy. The application server may encapsulate a corresponding index value into each live media stream data packet corresponding to (0 degrees, 360 degrees). In this example, the initial characteristic information set may be an index list including 0X00 to 0168.

For another example, a media stream parameter of the live media stream is a bit rate. It is assumed that bit rates supported by the application server are 10 Mbps, 5 Mbps, and 2 Mbps. The application server separately numbers a live media stream with a bit rate of 10 Mbps, a live media stream with a bit rate of 5 Mbps, and a live media stream with a bit rate of 2 Mbps. For example, when the bit rate is 10 Mbps, the index value encapsulated by the application server in a live media stream data packet is 000. When the bit rate is 5 Mbps, the index value encapsulated by the application server in a live media stream data packet is 001. When the bit rate is 2 Mbps, the index value encapsulated by the application server in a live media stream data packet is 010. In this example, the initial characteristic information set may be an index list including 000, 001, and 010.

In this operation, the application server may further send media indicator information and flow description information to the PCF by using an application request (AF Request) message. In an embodiment, the media indicator information indicates a core network to perform corresponding optimization on a media service. The flow description information describes a live media stream data characteristic corresponding to the live service. For example, the live media stream data feature may include IP 3 tuple information (e.g., a target IP address, a target port, and a transport layer protocol) of a live media stream on an AS side. A UPF may determine whether a service is a live media service by viewing header information in data.

In some embodiments, the application server may send the initial characteristic information set to the PCF via an AF. In an embodiment, after receiving the initial characteristic information set from the application server, the AF may send the initial characteristic information set to an NEF by using an Nnef_AFsessionWithQoS_Create service. After authentication, the NEF sends the initial characteristic information set to the PCF by using an Npcf_PolicyAuthorization_Create service.

Operation 302: UE1 sends a session establishment request message to an SMF network element.

In an embodiment, the session establishment request message is a NAS message. The session establishment request message may be a PDU session establishment request message or a PDU session modification request message.

Operation 303: After receiving the session establishment request message, the SMF network element obtains the initial characteristic information set from the PCF.

For example, the SMF network element initiates a request to the PCF. After receiving the request, the PCF sends Npcf_SMPolicyControl_Update/Create that carries the initial characteristic information set to the SMF. For another example, the PCF may alternatively send newly defined information that carries the initial characteristic information set to the SMF.

In a possible embodiment, the SMF network element may further obtain the media indicator information and a data flow rule from the PCF.

Operation 304: The SMF network element sends first indication information to the UPF network element.

The first indication information may be carried in an N4 session establishment message. In other words, after creating a session management policy association between the SMF network element and the PCF, the SMF network element sends, to the UPF, a session establishment request that is of N4 and that carries the first indication information. The first indication information indicates the UPF to monitor a downlink live media stream of a terminal device.

In a possible embodiment, the SMF network element may further send a packet detection rule (PDR) to the UPF. The PDR may be used for monitoring whether a current service is a corresponding live service, and for monitoring identification information in a downlink media stream.

Operation 305: The SMF network element further sends second indication information to a RAN, and sends third indication information to UE1.

The second indication information indicates the RAN to monitor the downlink live media stream of the terminal device.

The third indication information indicates to request and receive a media stream based on the initial characteristic information set and a subsequent indication from the RAN side.

In a possible case, the SMF network element may further send the initial characteristic information set to UE1.

For example, the SMF network element may send the second indication information (Indicator2) to the RAN side, and send the third indication information (Indicator3) and the initial characteristic information set to the RAN side and the UE side by using an Namf_Communication_N1N2MessageTransfer service message.

Operation 306: After session establishment is completed, the UPF monitors, based on the first indication information, a downlink live media stream sent to UE1, obtains characteristic information in a downlink live media stream data packet, and stores the characteristic information in a first active characteristic information set. In an embodiment, the characteristic information may be included in an IP/transport/application layer header of the data packet. This is not limited. For example, the UPF obtains through monitoring that the characteristic information in the downlink live media stream data packet sent to UE1 is 90 degrees, and therefore stores 90 degrees in the first active characteristic information set. For another example, the UPF obtains through monitoring that the characteristic information in the downlink live media stream data packet sent to UE1 is 001, and therefore stores 001 in the first active characteristic information set.

Operation 307: The UPF further encapsulates the characteristic information at a GTP layer (to be specific, a GTP-U layer) of the live media stream data packet.

For example, the UPF encapsulates the characteristic information "90 degrees" at a GTP layer of a live media stream data packet corresponding to "90 degrees" on an N3 link.

Operation 308: After receiving the second indication information from the SMF network element, the RAN monitors the GTP layer of the downlink live media stream data packet from the UPF, obtains the characteristic information in the downlink live media stream, and stores the characteristic information in a second active characteristic information set.

For example, the RAN obtains through monitoring that the characteristic information in the downlink live media stream data packet is 90 degrees, and therefore stores 90 degrees in the second active characteristic information set. For another example, the RAN obtains through monitoring that the characteristic information in the downlink live media stream data packet is 001, and therefore stores 001 in the second active characteristic information set.

In a possible embodiment, the RAN may further create a mapping relationship between characteristic information and UE1. For example, the RAN creates a mapping relationship between the characteristic information "90 degrees" and UE1. In this way, when a plurality of UEs access the RAN, the RAN may determine a live media stream corresponding to each UE served by the RAN.

In another possible embodiment, the RAN may further obtain a QFI corresponding to UE1 and first address information from the SMF network element. The QFI indicates the downlink live media stream sent to UE1. The first address information may include an IP address and/or a port number (port range). In an embodiment, the RAN may receive an N2 SM message from the SMF network element, and obtain the QFI and the first address information from the N2 SM message. Therefore, the RAN may establish a mapping relationship between UE1 and the first address information.

Operation 309: UE1 receives the third indication information from the SMF network element, and stores the third indication information.

The third indication information indicates to request and receive a media stream based on the initial characteristic information set and a subsequent indication from the RAN side.

In a possible embodiment, UE1 may further receive the initial characteristic information set from the SMF network element. In another possible embodiment, the foregoing method may further include operation 310: UE1 may alternatively learn of the initial characteristic information set by interacting with an application layer of the application server.

The following provides a specific example to describe the foregoing session establishment process.

With reference to FIG. 2B, UE1 to UE6 may respectively establish sessions corresponding to UE1 to UE6 according to the method shown in operation 301 to operation 309. If UE1 to UE6 are in a same live streaming room, it is very likely that UE1 to UE6 all access a same RAN and a same UPF network element, or UE1 to UE6 all access a same UPF network element. It is assumed that UE1 to UE6 all access the same RAN and the same UPF network element. In this case, the UPF network element monitors six downlink live media streams respectively sent to the six UEs. Therefore, a first active characteristic information set stored by the UPF network element includes characteristic information of the six downlink live media streams. In addition, a second active characteristic information set stored by the RAN also includes the characteristic information of the six downlink live media streams. In a possible case, the RAN may further send the second active characteristic information set including the characteristic information of the six downlink live media streams to UE1 to UE6 that are in a service range of the RAN, so that when determining that a live media stream needs to be switched, UE1 to UE6 search the second active characteristic information set for characteristic information corresponding to a live media stream requested to be switched.

For example, as shown in FIG. 2B, UE1 and UE6 correspond to downlink live media streams with same content, UE2 and UE3 correspond to downlink live media streams with same content, and UE4 and UE5 correspond to downlink live media streams with same content. Therefore, the first active characteristic information set stored by the UPF network element includes 001, 002, and 003. Because UE1 to UE6 also access the same RAN, the second active characteristic information set stored by the RAN also includes 001, 002, and 003.

It should be noted that, if UE1 to UE6 all access the same UPF network element, but UE2 to UE4 access RAN1, and UE1 and UE6 access RAN2, a second active characteristic information set stored by RAN1 also includes 002 and 003, and a second active characteristic information set stored by RAN1 also includes 001.

In addition, it should be noted that the first active characteristic information set and the second characteristic information set are not fixed, but are updated in real time. When UE of a new audience accesses the live media service, it is likely that a new PDU session is to be established. If characteristic information of a downlink live media stream transmitted by the newly established PDU session is 004, the first active characteristic information set includes 001, 002, 003, and 004. On the contrary, if UE1 and UE6 leave the service, a PDU session corresponding to UE1 and a PDU session corresponding to UE6 are released. In this case, the first active characteristic information set includes 002 and 003.

Further, with reference to FIG. 2B, if UE1 to UE6 all access the same RAN network element, after sessions of UE1 to UE6 are established, the RAN may establish a mapping relationship between an identifier of each UE, address information, and characteristic information of a live media stream according to the method shown in operation 208. For example, the mapping relationship is shown in Table 1.

TABLE 1

| UE identifier | Characteristic of a information live media stream | Network-side PDU session address | Port number/ Port range |
|---|---|---|---|
| UE1 | 001 | IP@1 | Port 1 |
| UE2 | 002 | IP@2 | Port 2 |
| UE3 | 002 | IP@3 | Port 3 |
| UE4 | 003 | IP@4 | Port 4 |
| UE5 | 003 | IP@5 | Port 5 |
| UE6 | 001 | IP@6 | Port 6 |

It can be learned from Table 1 that a session in which the live media stream of each UE is located has a corresponding IP and port number.

In this embodiment of this application, in a PDU session establishment process of a user, the SMF network element delivers corresponding indication information to the UE/RAN/UPF during session establishment, to ensure that the UE/RAN/UPF can quickly perform switching processing in a subsequent data transmission process based on characteristic information of a live media stream provided by the AF, so that timely media stream switching is ensured.

Embodiment 2

Based on delivery of characteristic information of a live media stream in a session establishment process in Embodiment 1, an application server, a core network element, and an access network element may remove duplicated media streams between the AS and a UPF network element and between the UPF network element and a RAN by identifying the characteristic information of the live media stream. In addition, according to the method, deduplication transmission of a live media stream between the AS and the RAN is implemented, thereby reducing transmission pressure between the core network element and the access network element, and improving resource utilization.

Figure 4A:
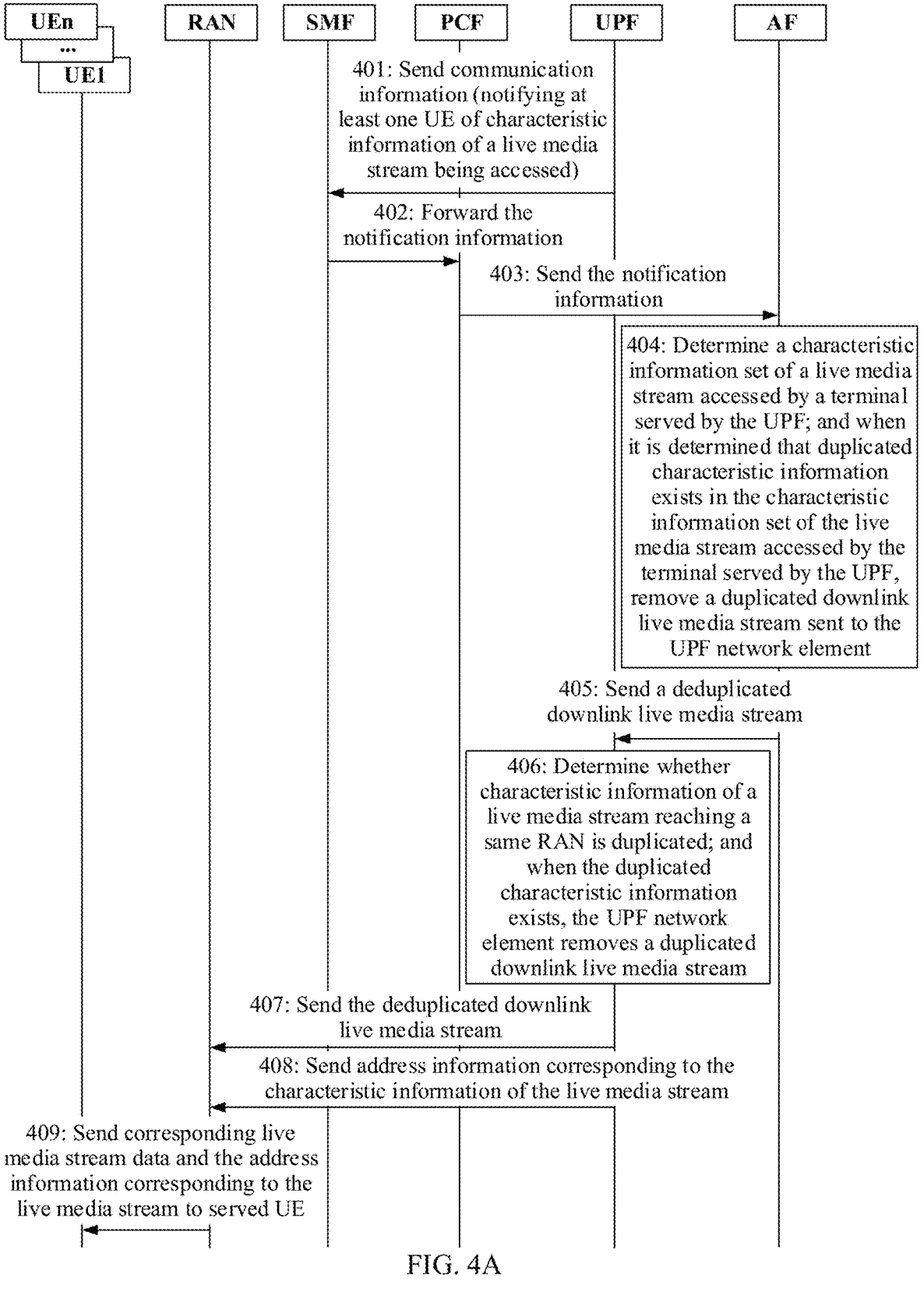
FIG. 4A is a schematic diagram of a data transmission method according to an embodiment of this application.

FIG. 4A shows a data transmission method according to an embodiment of this application. In an embodiment, the method includes the following operations.

Operation 401: After detecting, based on first indication information received from an SMF network element, that at least one UE accesses a live streaming service, a UPF network element sends notification information to the SMF network element. The notification information is for notifying the SMF network element of characteristic information of a live media stream that is being accessed by the at least one UE.

For example, with reference to FIG. 2B, the UPF network element detects that UE1 to UE6 access the live streaming service. Therefore, the UPF network element sends the notification information to the SMF network element by using an N4 session reporting procedure. The notification information is for notifying the SMF network element that the characteristic information of the live media streams being accessed by UE1 to UE6 is 001, 002, and 003.

Operation 402: The SMF network element forwards the notification information to a PCF side.

In an embodiment, the SMF network element may send the notification information to the PCF side by using a session management policy management modification procedure, and the corresponding notification information may include identity information of UE and identity information of a corresponding UPF.

Operation 403: The PCF notifies an AF/AS side of the notification information.

In an embodiment, the PCF may notify the AF/AS side of the notification information by using a capability exposure information Npcf_EventExposure_Notify message; or notify an NEF of the notification information by using an Npcf_EventExposure_Notify message, and then the NEF notifies the AF/AS side of the notification information by using an Nnef_EventExposure_Notify message.

Operation 404: The AF/AS side may determine, based on the received notification information, a characteristic information set of a live media stream accessed by a terminal served by the UPF. When it is determined that duplicated characteristic information exists in the characteristic information set of the live media stream accessed by the terminal served by the UPF, the AF/AS side removes a duplicated downlink live media stream sent to the UPF network element.

Operation 405: The AS/AF sends a deduplicated downlink live media stream to the UPF network element.

Operation 406: The UPF network element also determines, based on a monitoring result, whether characteristic information of a live media stream reaching a same RAN is duplicated. When duplicated characteristic information exists, the UPF network element removes the duplicated downlink live media stream.

In an embodiment, the UPF may determine, based on a downlink target IP address of a GTP tunnel, whether a RAN is the same RAN.

Operation 407: The UPF network element sends the deduplicated downlink live media stream to the RAN.

Operation 408: The UPF network element may further send address information corresponding to characteristic information of each deduplicated downlink live media stream to the RAN.

Specifically, in a possible embodiment, the UPF network element may send address information corresponding to each session to the SMF network element by using N4 session modification information, and then the SMF network element sends the address information to the RAN side by using an N2 SM message.

In another possible embodiment, the UPF network element may encapsulate the address information of the live media stream in a GTP layer of a downlink live media stream data packet, and send encapsulated downlink live media stream data to the RAN side.

Operation 409: After receiving the live media stream, the RAN sends corresponding live media stream data and address information corresponding to the live media stream to served UE based on a mapping relationship between an identifier of each UE, address information, and characteristic information of a live media stream (as shown in Table 1), to ensure that the UE can receive and parse these downlink live media stream data packets.

The following provides a specific example to describe the foregoing data transmission process.

Figure 4B:
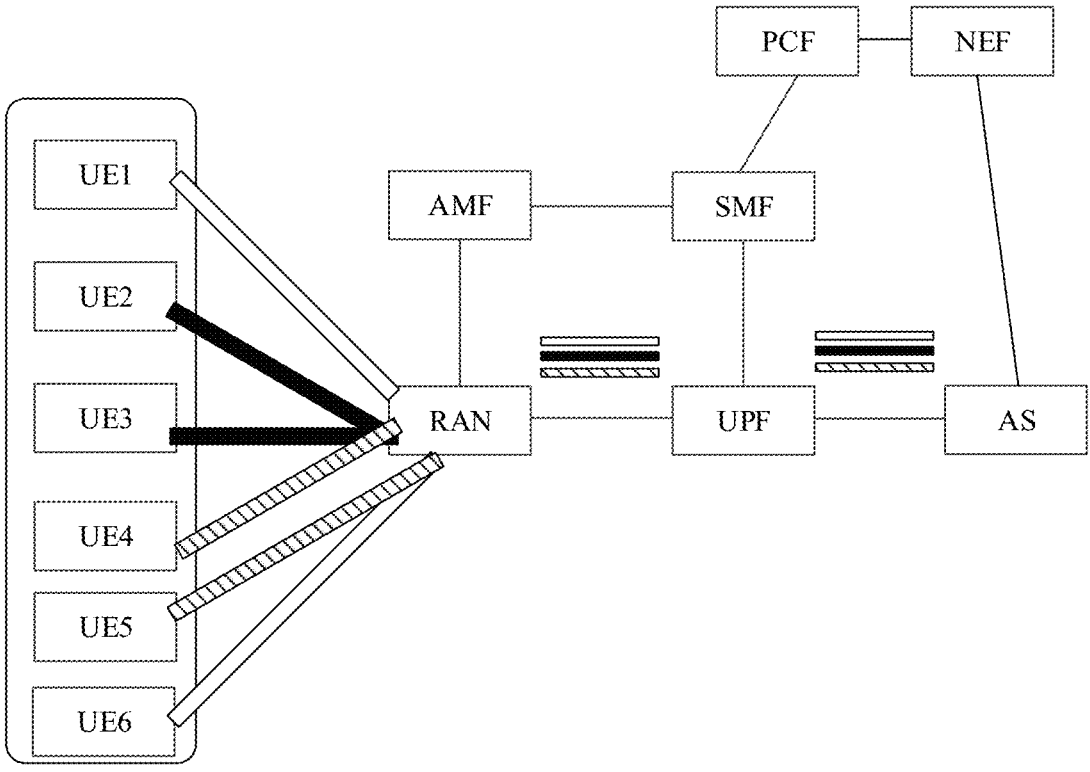
FIG. 4B is a schematic diagram of a media stream switching scenario according to an embodiment of this application.

With reference to FIG. 2B, UE1 to UE6 are in a same live streaming room. It is assumed that UE1 to UE6 all access a same RAN and a same UPF network element. In this case, the UPF network element monitors six downlink live media streams respectively sent to the six UEs. Therefore, the UPF network element may obtain characteristic information of six downlink live media streams. It is assumed that the characteristic information of the six downlink live media streams is shown in 1. The UPF network element sends notification information to the SMF network element, where the notification information includes the characteristic information of the six downlink live media streams. The SMF network element sends the notification information to the AF/AS via the PCF network element. The AF/AS side determines, based on the received notification information, that UE1 and UE6 correspond to downlink live media streams with same content, UE2 and UE3 correspond to downlink live media streams with same content, and UE4 and UE5 correspond to downlink live media streams with same content. Therefore, the AS/AF removes duplicated downlink live media streams. To be specific, as shown in FIG. 4B, only three quality of service flows (QoS flows) are transmitted between the AS/AF and the UPF network element, which are respectively a downlink live media stream carrying characteristic information 001, a downlink live media stream carrying characteristic information 002, and a downlink live media stream carrying characteristic information 003. The UPF network element sends the deduplicated downlink live media streams to the RAN, and further sends address information corresponding to the characteristic information of each downlink live media stream to the RAN. After receiving the live media streams, the RAN sends corresponding live media stream data and the address information corresponding to the live media streams to served UE1 to UE6 based on the mapping relationship between an identifier of each UE, address information, and characteristic information of a live media stream (as shown in Table 1), to ensure that the UE can receive and parse these downlink live media stream data packets.

In an embodiment of this application, the UPF network element monitors and identifies characteristic information of each live media stream, to determine duplicated media streams between the AS and the UPF network element and between the UPF network element and the RAN, and deduplication transmission between the AS and the UPF and between the UPF and the RAN is implemented, thereby reducing pressure of a live media stream on a backbone network and a transmission network. In addition, the UPF notifies the RAN side of address information corresponding to a downlink live media stream via a control plane or a user plane, and the RAN notifies corresponding UE of the address information, to ensure that the UE can still normally receive and parse live media data after deduplication transmission is performed.

Embodiment 3

This embodiment is a live media stream switching process. Based on delivery of characteristic information of a live media stream in a session establishment process in Embodiment 1, a RAN may directly determine a live media stream carrying characteristic information in currently transmitted live media streams based on the characteristic information in a switching request of UE, duplicate the live media stream, and send the duplicated live media stream to the UE, so that quick media stream switching is implemented.

Figure 5:
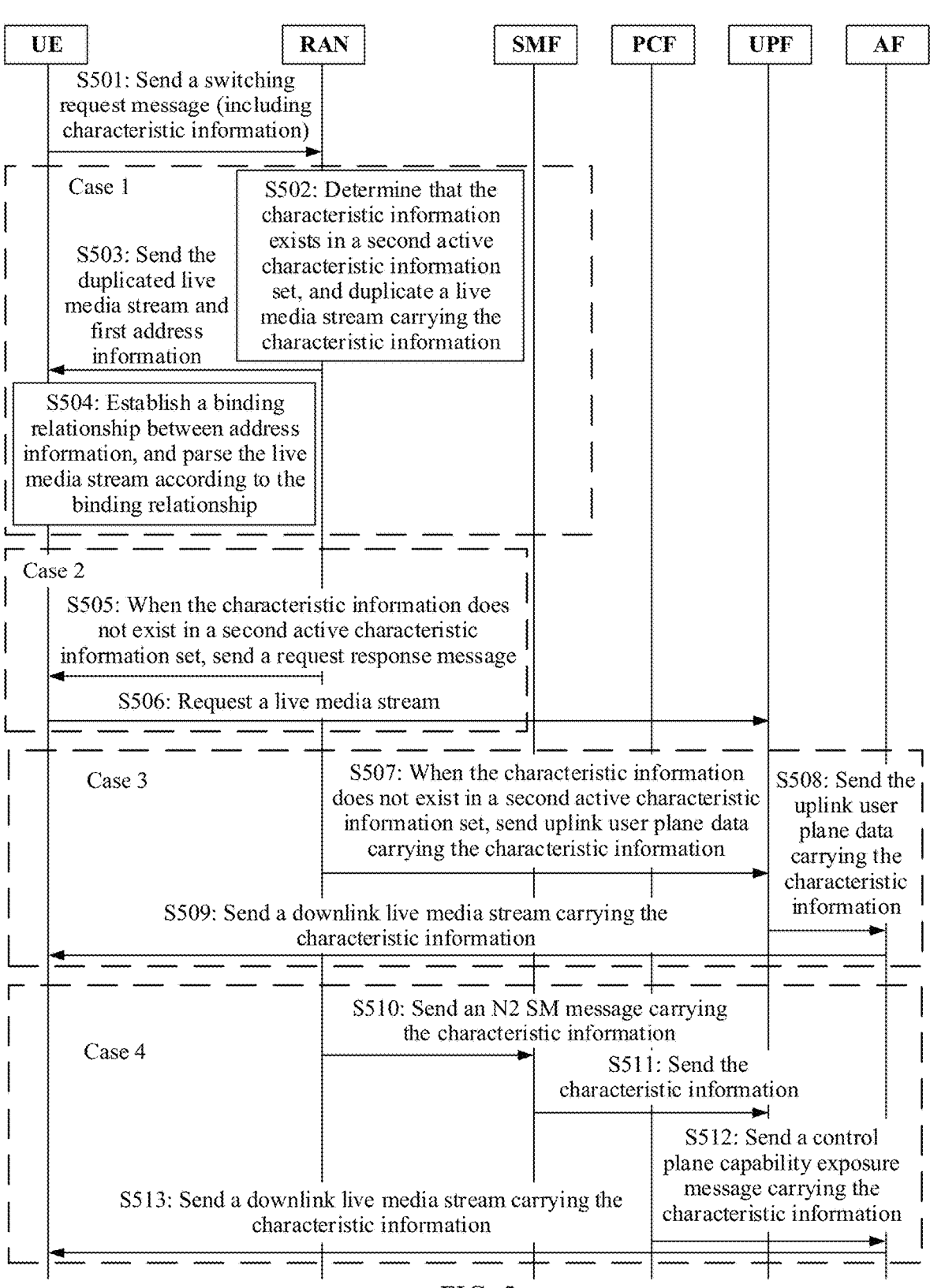
FIG. 5 is a schematic diagram of a live media stream switching method according to an embodiment of this application.

FIG. 5 shows a session establishment method according to an embodiment of this application. In an embodiment, the method includes the following operations.

Operation 501: UE sends a switching request message to a RAN, where the switching request message includes characteristic information of a live media stream.

In an embodiment, the UE may carry the characteristic information of the live media stream requested to be switched in an RRC message or a PDCP layer extension of uplink data, and send the characteristic information of the live media stream to the RAN side.

In a possible embodiment, it is assumed that the characteristic information of the live media stream requested to be switched is a media stream parameter value, for example, a field of view. In a first possible case, before performing operation 501, the UE may obtain a current media stream parameter value, for example, a field of view degree value, and carry characteristic information corresponding to the media stream parameter value in an RRC message or a PDCP layer extension of uplink data, and send the characteristic information to the RAN side. For example, if the UE is VR glasses, when the head of a user wearing the VR glasses rotates, the VR glasses may obtain a current field of view degree value of the user; and send, to the RAN side, an RRC message that carries the current field of view degree value. In a second possible case, if the UE receives an initial characteristic information set from an SMF network element in advance, before performing operation 501, the UE may search the initial characteristic information set for the characteristic information corresponding to the live media stream requested to be switched. In a third possible case, the UE receives a second active characteristic information set from the RAN network element in advance. In this case, before performing operation 501, the UE may search the second active characteristic information set for the characteristic information corresponding to the live media stream requested to be switched. If the characteristic information corresponding to the live media stream exists, operation 501 is performed; or if the characteristic information corresponding to the live media stream does not exist, the UE requests the to-be-switched live media stream from an application server via an application layer interaction process.

In another possible embodiment, it is assumed that the characteristic information of the live media stream requested to be switched is an index value. For example, when a field of view is 0 degrees, an index value encapsulated by an application server in a live media stream data packet is 0X00. In a first possible case, if the UE receives an initial characteristic information set from an SMF network element in advance, before performing operation 501, the UE may first search the initial characteristic information set for the characteristic information (for example, 0X00) corresponding to the live media stream requested to be switched. In a second possible case, the UE receives a second active characteristic information set from the RAN network element. In this case, before performing operation 501, the UE may search the second active characteristic information set for the characteristic information corresponding to the live media stream requested to be switched. If the characteristic information corresponding to the live media stream exists, operation 501 is performed; or if the characteristic information corresponding to the live media stream does not exist, the UE requests the to-be-switched live media stream from the application server via an application layer interaction process.

In a possible embodiment, when the UE supports a technology of dynamic adaptive network adjustment of a media stream parameter, a terminal sends an adjusted live media stream parameter to the RAN based on a network status. For example, when a resolution of streaming media data set by a user on a live streaming application client is adaptive, the terminal dynamically adjusts a bit rate of the streaming media data based on network condition information such as a packet loss rate of the streaming media data and a network throughput, and then the UE sends characteristic information corresponding to the adjusted bit rate of the streaming media data to the RAN.

Case 1

Operation 502: After receiving the switching request from the UE, the RAN side determines whether the characteristic information exists in the second active characteristic information set; and if the characteristic information exists, duplicates the live media stream carrying the characteristic information.

Operation 503: The RAN sends the duplicated live media stream to the UE. In addition, before this operation, the RAN may further determine, based on a mapping relationship between characteristic information and address information, first address information (for example, an IP address and a port number) corresponding to the characteristic information, and send the first address information to the UE.

In an embodiment, the RAN forwards a live media data flow that carries the characteristic information to a QoS flow of the UE, to be specific, a DRB corresponding to the QoS flow of the UE; and discards media stream data that is sent to the QoS flow and that carries original characteristic information on an original interface.

Operation 504: The UE receives live media stream data and the first address information from the RAN, and the UE establishes a binding relationship between the first address information and originally used second address information, to parse and apply the received live media stream based on the binding relationship.

In an embodiment, the UE establishes a binding relationship between received IP/port information and original IP/port information; after receiving a live media stream data packet, parses the data packet based on the binding relationship; and transmits media stream data in a received IP/port to an upper-layer application corresponding to an original IP/port.

Case 2

Operation 505: After receiving the switching request from the UE, the RAN side determines that the characteristic information does not exist in the second active characteristic information set, and the RAN sends a request response message to the UE, where the request response message is for notifying the UE that switching fails.

For example, the UE side does not receive the second active characteristic information set from the RAN, and the RAN does not find the characteristic information in the second active characteristic information set. Alternatively, the RAN determines that the live media stream including the characteristic information does not exist currently. In this case, the RAN sends the request response message to the UE.

Operation 506: The UE requests the to-be-switched live media stream from the application server via the application layer interaction process.

In other words, the UE requests the live media stream from the application server via an existing application layer interaction process.

Case 3

Operation 507: After the RAN side receives the switching request from the UE, when the RAN side determines that the characteristic information does not exist in the second active characteristic information set, the RAN side carries the characteristic information that is in the switching request of the UE in uplink user plane data; and sends the uplink user plane data to a UPF network element.

In an embodiment, the RAN may carry the characteristic information that is in the switching request of the UE in a GTP layer of uplink data, and then send the uplink data to the UPF network element.

Operation 508: After the UPF network element receives the uplink user plane data from the RAN side, the UPF encapsulates the characteristic information at an IP/transport/application layer (where all the layers are possible, and this is not specifically limited) of the user plane data, and then sends the uplink user plane data to the application server side.

Operation 509: After receiving the uplink user plane data that carries the characteristic information, the AS side adjusts a live media stream sent to the UE, and then sends a downlink live media stream that carries and corresponds to the characteristic information to the UE.

Case 4

Operation 510: After the RAN side receives the switching request from the UE, the RAN side determines that the characteristic information does not exist in the second active characteristic information set. In this case, the RAN side sends an N2 SM message including the characteristic information in the switching request of the UE to the SMF network element.

Operation 511: After receiving the N2 SM message from the RAN side, the SMF network element initiates a session management policy association modification procedure, and sends the characteristic information in the switching request of the UE to a PCF.

Operation 512: The PCF sends the characteristic information in the switching request of the UE to the application server side by using a capability exposure message (for example, by using an Npcf_EventExposure_Notify service).

Operation 513: After receiving a control plane capability exposure message, the application server side adjusts a QoS flow sent to the UE, and then sends a downlink live media stream carrying the characteristic information to the UE.

The following provides a specific example to describe the foregoing media stream switching process.

With reference to FIG. 2A, it is assumed that UE1 to UE6 are VR glasses. There are six audiences in a live streaming room of a football match. A football match video played in the live streaming room is a 360-degree panoramic VR video. When the head of an audience using UE1 rotates, a field of view of UE1 changes, and it is assumed that the field of view changes from a first field of view to a second field of view. If UE1 stores a second active characteristic information set, UE1 first searches an initial characteristic information set for an index value 002 corresponding to a live media stream of the second field of view, and then searches the second active characteristic information set for the index value 002. If the index value 002 exists, UE1 sends a switching request to the RAN, where the switching request includes the index value 002, and the switching request is for requesting the live media stream of the second field of view. After receiving the switching request, the RAN first searches the second active characteristic information set to determine whether the index value 002 exists. It is assumed that the second active characteristic information set includes 002. In this case, the RAN duplicates a live media stream carrying the index value 002, sends the duplicated live media stream to UE1, and discards a live media stream data packet sent to UE1 on an original interface. It can be learned that, according to the method, UE1 may obtain a downlink live media stream corresponding to the second field of view from the RAN in a timely manner, to effectively reduce a media stream switching delay.

In an embodiment of this application, the UPF can monitor a live media stream of a terminal in a service range, and the RAN also establishes a mapping relationship between a second active characteristic information set for accessing a live media stream in RAN coverage, a live media stream being accessed, and address information corresponding to a media stream. Therefore, when the UE side requests to switch to a live media stream, the RAN can switch to and deliver the live media stream in a timely manner based on the local mapping relationship and characteristic information in a switching request message of the UE, to ensure user's live media watching experience.

Embodiment 4

This embodiment of this application is a live media stream switching process. Based on delivery of characteristic information of a live media stream in a session establishment process in Embodiment 1, a UPF network element may directly determine a live media stream carrying characteristic information in currently transmitted live media streams based on the characteristic information in a switching request of UE, duplicate the live media stream, and send the duplicated live media stream to the UE, so that quick media stream switching is implemented.

Figure 6A:
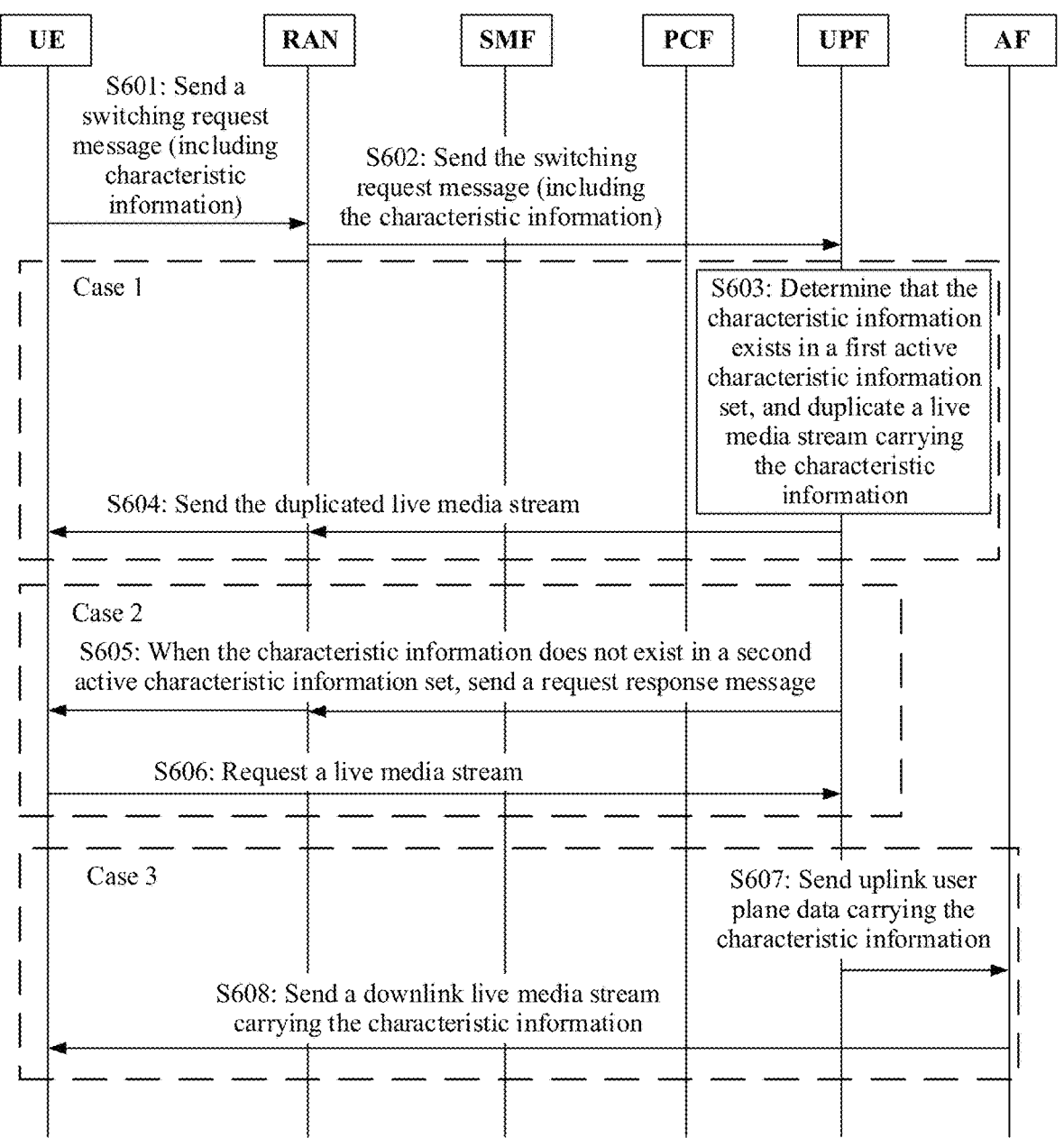
FIG. 6A is a schematic diagram of a live media stream switching method according to an embodiment of this application.

FIG. 6A shows a live media stream switching method according to an embodiment of this application. In an embodiment, the method includes the following operations.

Operation 601: UE sends a switching request message to a RAN, where the switching request message includes characteristic information of a live media stream.

In an embodiment, the UE may carry the characteristic information of the live media stream requested to be switched in an RRC message or a PDCP layer of uplink data, and send the characteristic information of the live media stream to the RAN side.

In a possible embodiment, it is assumed that the characteristic information of the live media stream requested to be switched is a media stream parameter value, for example, a field of view. In a first possible case, before performing operation 601, the UE may obtain a current media stream parameter value, for example, a field of view degree value, and carry the media stream parameter value in an RRC message or a PDCP layer extension of uplink data, and send the media stream parameter value to the RAN side. For example, if the UE is VR glasses, when the head of a user wearing the VR glasses rotates, the VR glasses may obtain a current field of view degree value of the user; and send, to the RAN side, an RRC message that carries the current field of view degree value. In a second possible case, if the UE receives an initial characteristic information set from an SMF network element in advance, before performing operation 601, the UE may search the initial characteristic information set for the characteristic information corresponding to the live media stream requested to be switched. In a third possible case, the UE receives a second active characteristic information set from the RAN network element or an application server in advance. In this case, before performing operation 601, the UE may search the second active characteristic information set for the characteristic information corresponding to the live media stream requested to be switched. If the characteristic information corresponding to the live media stream exists, operation 601 is performed; or if the characteristic information corresponding to the live media stream does not exist, the UE requests the to-be-switched live media stream from the application server via an application layer interaction process.

In an embodiment, UE1 may obtain the second active characteristic information set from the application server through the following operations.

Operation a: After detecting that a live media stream corresponding to the UE exists, a UPF network element sends, via an N4 session reporting procedure, indication information to notify the SMF that the live media stream corresponding to the UE exists.

Operation b: The SMF sends notification information to a PCF side via a session management policy management modification procedure, where the notification information may include identity information of the UPF and identity information of the UE.

Operation c: The PCF notifies the AF/AS side of the indication information by using a capability exposure information Npcf_EventExposure_Notify message; or notifies an NEF of the notification information by using an Npcf_EventExposure_Notify message, and then the NEF notifies the AF/AS side of the notification information by using an Nnef_EventExposure_Notify message.

Operation d: After receiving the notification information from a core network, the AS may learn of a first active characteristic information set corresponding to the UPF.

Alternatively, the AS may receive a first active characteristic information set from the UPF.

Operation e: The AS/AF sends the first active characteristic information set to the UE side by using application layer information.

In another possible embodiment, it is assumed that the characteristic information of the live media stream requested to be switched is an index value. For example, when a field of view is 0 degrees, an index value encapsulated by an application server in a live media stream data packet is 0X00. In a first possible case, if the UE receives an initial characteristic information set from an SMF network element in advance, before performing operation 601, the UE may first search the initial characteristic information set for the characteristic information (for example, 0X00) corresponding to the live media stream requested to be switched. In a second possible case, the UE receives a second active characteristic information set from the RAN network element or the application server in advance. In this case, before performing operation 601, the UE may search the second active characteristic information set for the characteristic information corresponding to the live media stream requested to be switched. If the characteristic information corresponding to the live media stream exists, operation 601 is performed; or if the characteristic information corresponding to the live media stream does not exist, the UE requests the to-be-switched live media stream from the application server via an application layer interaction process.

In a possible embodiment, when the UE supports a technology of dynamic adaptive network adjustment of a media stream parameter, a terminal sends characteristic information corresponding to an adjusted live media stream parameter to the RAN based on a network status. For example, when a resolution of streaming media data set by a user on a live streaming application client is adaptive, the terminal dynamically adjusts a bit rate of the streaming media data based on network condition information such as a packet loss rate of the streaming media data and a network throughput, and then the UE sends characteristic information corresponding to the adjusted bit rate of the streaming media data to the RAN.

Case 1

Operation 602: After receiving the switching request from the UE, the RAN side forwards the characteristic information in the switching request to the UPF network element.

In an embodiment, the RAN receives an RRC message or an uplink data packet with a PDCP layer extension bit from the UE, where the RRC message carries the characteristic information or a PDCP layer of the uplink data packet carries the characteristic information. The RAN encapsulates the characteristic information at a GTP-U layer of the uplink data packet, and then sends the encapsulated uplink data packet to the UPF network element.

Operation 603: After receiving the uplink data packet, the UPF determines whether the characteristic information in the uplink data packet is in the first active characteristic information set; and if the characteristic information is in the first active characteristic information set, duplicates a live media data flow that carries the characteristic information.

Operation 604: The UPF forwards the duplicated live media data flow to a corresponding QoS flow of the corresponding UE, and discards a media stream data packet that is in the QoS flow, that is sent to the UE through an original N6 interface, and that carries original characteristic information.

In a possible embodiment, the UPF modifies address information in a live media stream, to be specific, replaces original second address information in a data packet of a first live media stream with first address information, and then sends the modified data packet of the live media stream to the UE.

In another possible embodiment, the UPF may alternatively change original destination address information in a live media stream data packet to address information of the UE, to ensure that the UE can correctly receive the data packet.

Case 2

Operation 605: After receiving the switching request from the UE, the UPF side determines that the characteristic information does not exist in the first active characteristic information set, and the UPF sends a request response message to the UE via the RAN, where the request response message is for notifying the UE that switching fails.

For example, the UPF does not find the characteristic information in the first active characteristic information set. Alternatively, the UPF determines that the live media stream including the characteristic information does not exist currently. In this case, the UPF sends the request response message to the UE.

Operation 606: The UE requests the to-be-switched live media stream from the application server via the application layer interaction process.

In other words, the UE requests the live media stream from the application server via an existing application layer interaction process.

Case 3

Operation 607: After receiving the characteristic information, the UPF determines that the characteristic information does not exist in the first active characteristic information set, and then the UPF encapsulates the characteristic information at an IP/transport/application layer (where this is not specifically limited) of uplink user plane data, and sends the encapsulated uplink data to the AF/AS side.

Operation 608: After receiving the uplink user plane data that carries the characteristic information, the AF/AS side adjusts a live media data flow sent to the UE, and then sends a downlink live media stream that carries and corresponds to the characteristic information to the UE.

The following provides a specific example to describe the foregoing media stream switching process.

Figure 6B:
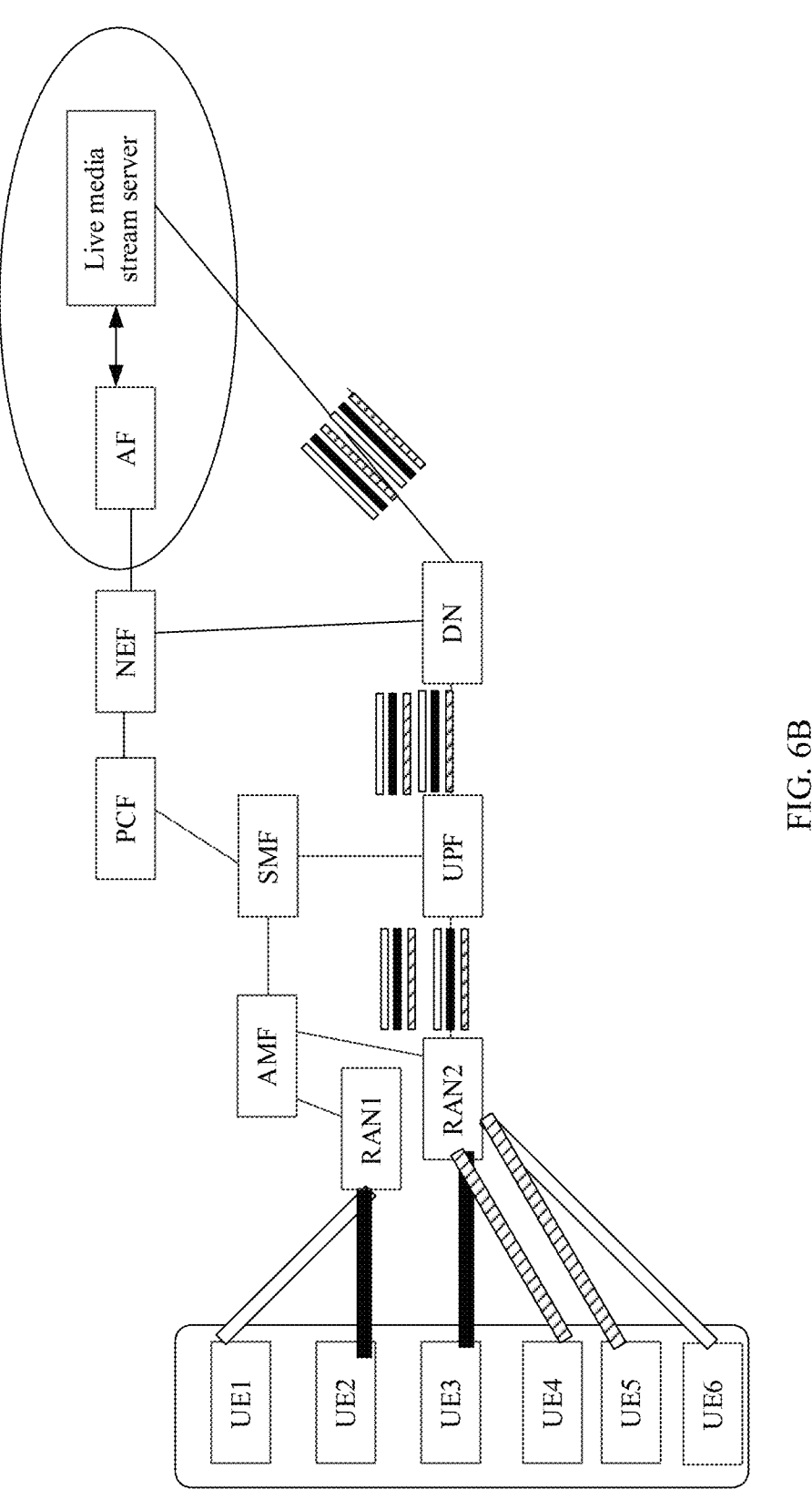
FIG. 6B is a schematic diagram of a media stream switching scenario according to an embodiment of this application.

It is assumed that UE1 to UE6 are VR glasses. There are six audiences in a live streaming room of a football match. A football match video played in the live streaming room is a 360-degree panoramic VR video. As shown in FIG. 6B, UE1 and UE2 access RAN1, UE2 to UE6 access RAN2, and UE1 to UE6 all access a same UPF network element. When the head of an audience using UE1 rotates, a field of view of UE1 changes, and it is assumed that the field of view changes from a first field of view to a second field of view. If UE1 stores a second active characteristic information set, UE1 first searches an initial characteristic information set for an index value 002 corresponding to a live media stream of the second field of view. UE1 sends a switching request to RAN1, where the switching request includes the index value 002, and the switching request is for requesting the live media stream of the second field of view. After receiving the switching request, RAN1 notifies the UPF network element of the request by using a GTP indication, and the UPF network element adjusts the live media stream. In an embodiment, the UPF network element may first search for the index value 002 in a first active characteristic information set. It is assumed that the first active characteristic information set includes 002. In this case, the UPF duplicates a live media stream carrying the index value 002, modifies address information in a live media stream data packet, and sends the modified live media stream to the RAN. The RAN forwards the modified live media stream to UE1, and discards a live media stream data packet sent to UE1 on an original interface. It can be learned that, according to the method, UE1 may receive and parse a downlink live media stream corresponding to the second field of view from the RAN side in a timely manner, to effectively reduce a media stream switching delay.

In an embodiment of this application, the UPF side establishes a mapping relationship between a user, a live media stream that is being accessed, and characteristic information. When the UE side initiates a live media stream switching request, the UPF switches and delivers a media stream and modifies IP/port information based on characteristic information in the request and the mapping relationship. In this way, live media stream switching is implemented, and a media stream switching delay is effectively reduced.

Embodiment 5

This embodiment of this application is a live media stream switching process. Based on delivery of characteristic information of a live media stream in a session establishment process in Embodiment 1, a RAN may directly determine a live media stream carrying characteristic information in currently transmitted live media streams based on the characteristic information in a switching request of UE, duplicate the live media stream, and send the duplicated live media stream to the UE, so that quick live media stream switching is implemented. When the RAN determines, based on the characteristic information in the switching request of the UE, that no live media stream carrying the characteristic information exists in the currently transmitted live media streams, the RAN may send the characteristic information to a UPF network element. Then, the UPF network element may directly determine the live media stream carrying the characteristic information in the currently transmitted live media streams based on the characteristic information in the switching request of the UE, duplicate the live media stream, and send the duplicated live media stream to the UE, so that quick media stream switching is implemented.

Figure 7A:
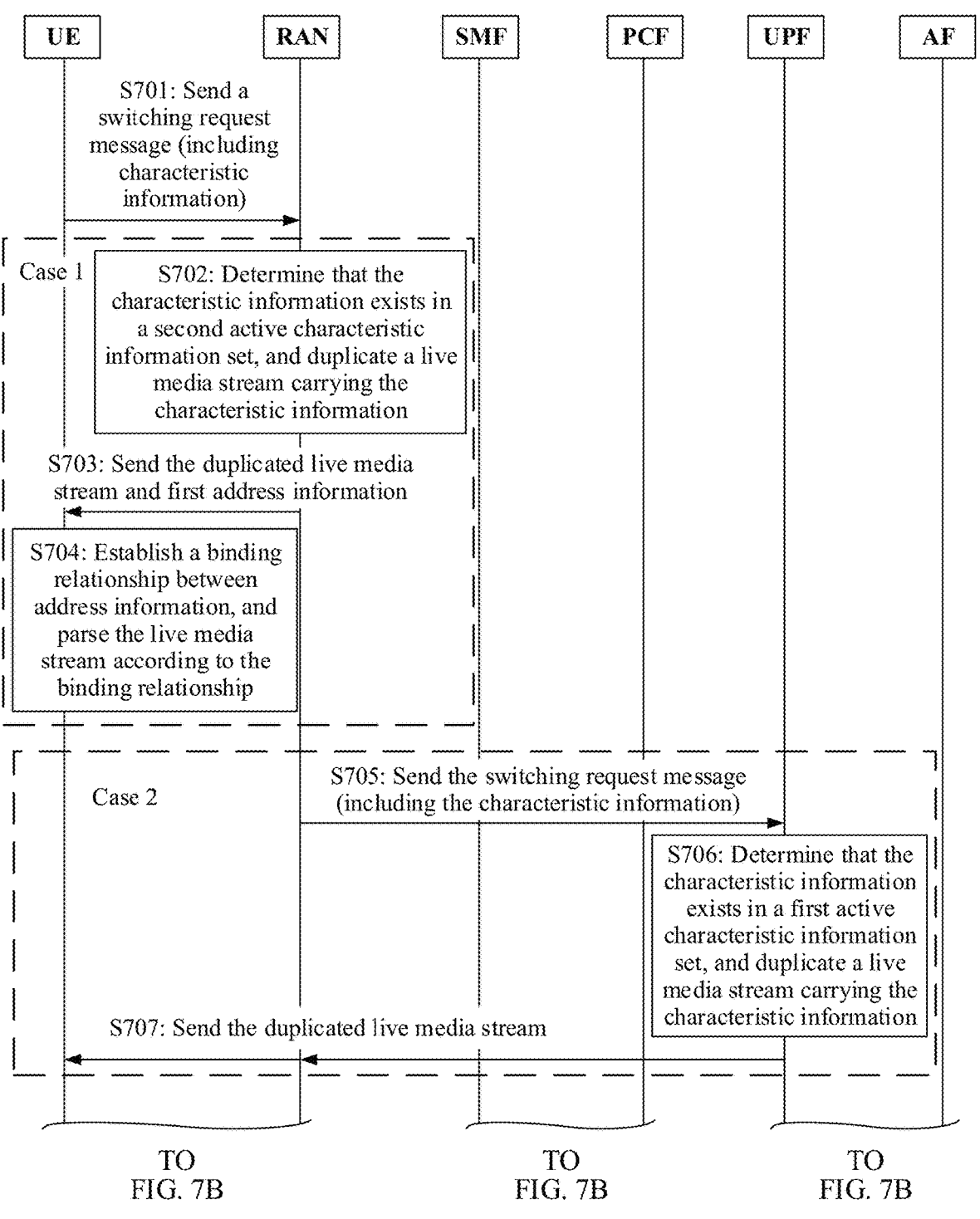
FIG. 7A and FIG. 7B are a schematic diagram of a live media stream switching method according to an embodiment of this application.
Figure 7B:
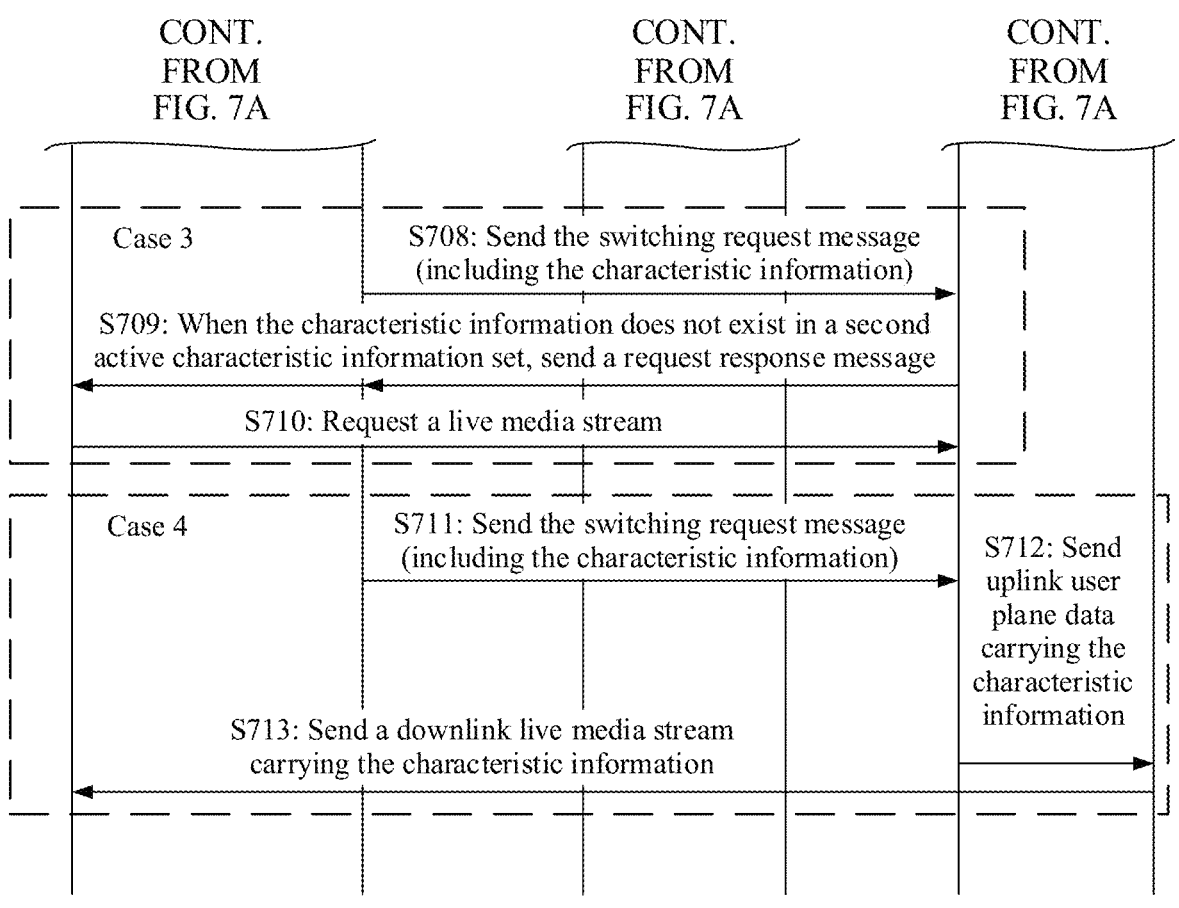

FIG. 7A and FIG. 7B show a live media stream switching method according to an embodiment of this application. In an embodiment, the method includes the following operations.

Operation 701: UE sends a switching request message to a RAN, where the switching request message includes characteristic information of a live media stream.

In an embodiment, the UE may carry the characteristic information of the live media stream requested to be switched in an RRC message or a PDCP layer extension of uplink data, and send the characteristic information of the live media stream to the RAN side. For specific content of the characteristic information of the live media stream and a process of how the UE determines the characteristic information of the live media stream before sending, refer to operation 501. Details are not described herein again.

Case 1

Operation 702: After receiving the switching request from the UE, the RAN side determines whether the characteristic information exists in a second active characteristic information set; and if the characteristic information exists, duplicates the live media stream carrying the characteristic information.

Operation 703: The RAN sends the duplicated live media stream to the UE. In addition, before this operation, the RAN may further determine, based on a mapping relationship between characteristic information and address information, first address information (for example, an IP address and a port number) corresponding to the characteristic information, and send the first address information to the UE.

In an embodiment, the RAN forwards a live media data flow that carries the characteristic information to a QoS flow of the UE, to be specific, a DRB corresponding to the QoS flow of the UE; and discards data that is sent to the QoS flow on an original interface.

Operation 704: The UE receives live media stream data and the first address information from the RAN, and the UE establishes a binding relationship between the first address information and originally used second address information, to parse and apply the received live media stream based on the binding relationship.

In an embodiment, the UE establishes a binding relationship between received IP/port information and original IP/port information; after receiving a live media stream data packet, parses the data packet based on the binding relationship; and transmits media stream data in a received IP/port to an upper-layer application corresponding to an original IP/port.

Case 2

Operation 705: After the RAN side receives the switching request from the UE, the RAN side determines that the characteristic information does not exist in the second active characteristic information set, and forwards the characteristic information in the switching request to a UPF network element.

In an embodiment, the RAN receives an RRC message or an uplink data packet from the UE, where the RRC message carries the characteristic information or a PDCP layer extension of the uplink data packet carries the characteristic information. The RAN encapsulates the characteristic information at a GTP layer of the uplink data packet, and then sends the encapsulated uplink data packet to the UPF network element.

Operation 706: After receiving the corresponding uplink data packet, the UPF determines, based on the GTP layer characteristic information, whether the characteristic information is in a first active characteristic information set; and if the characteristic information is in the first active characteristic information set, duplicates a live media data flow that carries the characteristic information.

Operation 707: The UPF network element forwards the duplicated live media data flow to a QoS flow of the corresponding UE, and discards a media stream data packet that is in the QoS flow, that is sent to the UE through an original N6 interface, and that carries original characteristic information.

In a possible embodiment, the UPF modifies address information in a live media stream, to be specific, replaces original second address information in a data packet of a first live media stream with first address information, and then sends the modified data packet of the live media stream to the UE.

In another possible embodiment, the UPF may alternatively change original destination address information in a live media stream data packet to address information of the UE, to ensure that the UE can correctly receive the data packet.

Case 3

Operation 708: After the RAN side receives the switching request from the UE, the RAN side determines that the characteristic information does not exist in the second active characteristic information set, and forwards the characteristic information in the switching request to a UPF network element.

In an embodiment, the RAN receives an RRC message or an uplink data packet from the UE, where the RRC message carries the characteristic information or a PDCP layer of the uplink data packet carries the characteristic information. The RAN encapsulates the characteristic information at a GTP layer of the uplink data packet, and then sends the encapsulated uplink data packet to the UPF network element.

Operation 709: After receiving the switching request from the UE, the UPF side determines that the characteristic information does not exist in the first active characteristic information set, and the UPF sends a request response message to the UE via the RAN, where the request response message is for notifying the UE that switching fails.

For example, the UPF does not find the characteristic information in the first active characteristic information set. Alternatively, the UPF determines that the live media stream including the characteristic information does not exist currently. In this case, the UPF sends the request response message to the UE.

Operation 710: The UE requests the to-be-switched live media stream from an application server via an application layer interaction process.

In other words, the UE requests the live media stream from the application server via an existing application layer interaction process.

Case 4

Operation 711: After the RAN side receives the switching request from the UE, the RAN side determines that the characteristic information does not exist in the second active characteristic information set, and forwards the characteristic information in the switching request to a UPF network element.

In an embodiment, the RAN receives an RRC message or an uplink data packet from the UE, where the RRC message carries the characteristic information or a PDCP layer of the uplink data packet carries the characteristic information. The RAN encapsulates the characteristic information at a GTP layer of the uplink data packet, and then sends the encapsulated uplink data packet to the UPF network element.

Operation 712: After receiving the characteristic information, the UPF determines that the characteristic information does not exist in the first active characteristic information set, and then the UPF encapsulates the characteristic information at an IP/transport/application layer (where this is not specifically limited) of uplink user plane data, and sends the encapsulated uplink data to an AF/AS side.

Operation 713: After receiving the uplink user plane data that carries the characteristic information, the AF/AS side adjusts a live media stream sent to the UE, and then sends a downlink live media stream that carries and corresponds to the characteristic information to the UE.

The following provides a specific example to describe the foregoing media stream switching process.

It is assumed that UE1 to UE6 are VR glasses. There are six audiences in a live streaming room of a football match. A football match video played in the live streaming room is a 360-degree panoramic VR video. As shown in FIG. 6B, UE1 and UE2 access RAN1, UE3 to UE6 access RAN2, and UE1 to UE6 all access a same UPF network element. When the head of an audience using UE1 rotates, a field of view of UE1 changes, and it is assumed that the field of view changes from a first field of view to a second field of view. If UE1 stores a second active characteristic information set, UE1 first searches an initial characteristic information set for an index value 002 corresponding to a live media stream of the second field of view. UE1 sends a switching request to RAN1, where the switching request includes the index value 002, and the switching request is for requesting the live media stream of the second field of view. After receiving the switching request, the RAN first searches the second active characteristic information set to determine whether the index value 002 exists. It is assumed that the second active characteristic information set includes 002. In this case, the RAN duplicates a live media stream carrying the index value 002, sends the duplicated live media stream to UE1, and discards a live media stream data packet sent to UE1 on an original interface. If RAN1 finds that the index value 002 does not exist in the second active characteristic information set, RAN1 notifies the UPF network element of the request by using a GTP indication, and the UPF network element adjusts the live media stream. In an embodiment, the UPF network element may first search for the index value 002 in a first active characteristic information set. It is assumed that the first active characteristic information set includes 002. In this case, the UPF duplicates a live media stream carrying the index value 002, modifies address information in a live media stream data packet, and sends the modified live media stream to the RAN. The RAN forwards the modified live media stream to UE1, and discards a live media stream data packet sent to UE1 on an original interface. It can be learned that, according to the method, UE1 may receive and parse a downlink live media stream corresponding to the second field of view from the RAN side in a timely manner, to effectively reduce a media stream switching delay.

In an embodiment of this application, the RAN and the UPF side establish a mapping relationship between a user, a live media stream that is being accessed, and characteristic information. When the UE side initiates a live media stream switching request, the RAN and/or the UPF switch and deliver a media stream and modifies IP/port information based on characteristic information in the request and the mapping relationship. In this way, live media stream switching is implemented, and a media stream switching delay is effectively reduced.

For Embodiment 1 to Embodiment 5, it should be noted that: (1) Embodiment 2 and Embodiment 3 may be separately implemented in different scenarios, or may be implemented in combination in a same scenario. Embodiment 2 and Embodiment 4 may be separately implemented in different scenarios, or may be implemented in combination in a same scenario. Embodiment 2 and Embodiment 5 may be separately implemented in different scenarios, or may be implemented in combination in a same scenario. This is not specifically limited.

(2) Operation numbers in the flowcharts described in embodiments of this application are merely an example of an execution procedure, and do not constitute a limitation on an execution sequence of the operations. In embodiments of this application, there is no strict execution sequence between operations that do not have a time sequence dependency relationship with each other.

For Embodiment 1 to Embodiment 5, it should be further noted that: The foregoing actions that can be performed by the UPF can alternatively be performed by an edge application server, where the edge application server may be understood as an application server that is deployed closer to a user side, to reduce response time and pressure on a transmission network. Accordingly, the application server in the foregoing embodiments may be a central application server. It may also be understood that, in Embodiment 1 to Embodiment 5, the UPF may be replaced with the edge application server, and the application server may be replaced with the central application server, to implement the media stream switching method.

The foregoing mainly describes the solutions provided in embodiments of this application from a perspective of interaction between a network device and a terminal device. It may be understood that, to implement the foregoing functions, the network device or the terminal device may include a corresponding hardware structure and/or a software module for performing each function. A person skilled in the art should be easily aware that, in combination with units and algorithm operations of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of this application.

In embodiments of this application, division into functional units may be performed on the terminal device and the network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 8:
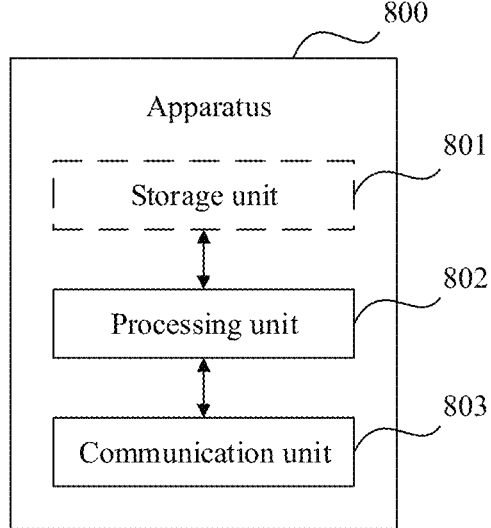
FIG. 8 is a schematic diagram of a structure of a communication apparatus according to an embodiment of this application.

When an integrated unit is used, FIG. 8 is a possible example block diagram of an apparatus according to an embodiment of this application. As shown in FIG. 8, an apparatus 800 may include a processing unit 802 and a communication unit 803. The processing unit 802 is configured to control and manage actions of the apparatus 800. The communication unit 803 is configured to support communication between the apparatus 800 and another device. Optionally, the communication unit 803 is also referred to as a transceiver unit, and may include a receiving unit and/or a sending unit, respectively configured to perform a receiving operation and a sending operation. The apparatus 800 may further include a storage unit 801, configured to store program code and/or data of the apparatus 800.

The apparatus 800 may be the terminal device in any one of the foregoing embodiments, or may be a chip disposed in the terminal device. The processing unit 802 may support the apparatus 800 in performing actions of the terminal device in the foregoing method examples. Alternatively, the processing unit 802 mainly performs an internal action of the terminal device in the method examples, and the communication unit 803 may support communication between the apparatus 800 and a network device.

The apparatus 800 may be the network device in any one of the foregoing embodiments, or may be a chip disposed in the network device. The network device may refer to the foregoing access network device, user plane function network element, session management function network element, application server, or the like. The processing unit 802 may support the apparatus 800 in performing actions of the network device in the foregoing method examples. Alternatively, the processing unit 802 mainly performs an internal action of the network device in the method examples, and the communication unit 803 may support communication between the apparatus 800 and a network device. For example, the processing unit 802 may be configured to perform an internal action of the network device in the method examples, and the communication unit 803 may be configured to support communication between the apparatus 800 and a terminal device.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. In addition, such units may be integrated together or may be individually implemented. The processing element herein may also be referred to as a processor, and may be an integrated circuit having a signal processing capability. In an implementation process, operations in the foregoing methods or the foregoing units may be implemented by using a hardware integrated logic circuit in the processing element, or may be implemented in a form in which the processing element invokes software.

In an example, any one of the foregoing units in the apparatus may be one or more integrated circuits configured to implement the foregoing methods, for example, one or more application-specific integrated circuits (ASICs), one or more microprocessors (DSPs), one or more field programmable gate arrays (FPGAs), or a combination of at least two of these integrated circuit forms. For another example, when the units in the apparatus may be implemented in a form in which a processing element schedules a program, the processing element may be a processor, for example, a general-purpose central processing unit (CPU) or another processor that can invoke the program. For still another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 9:
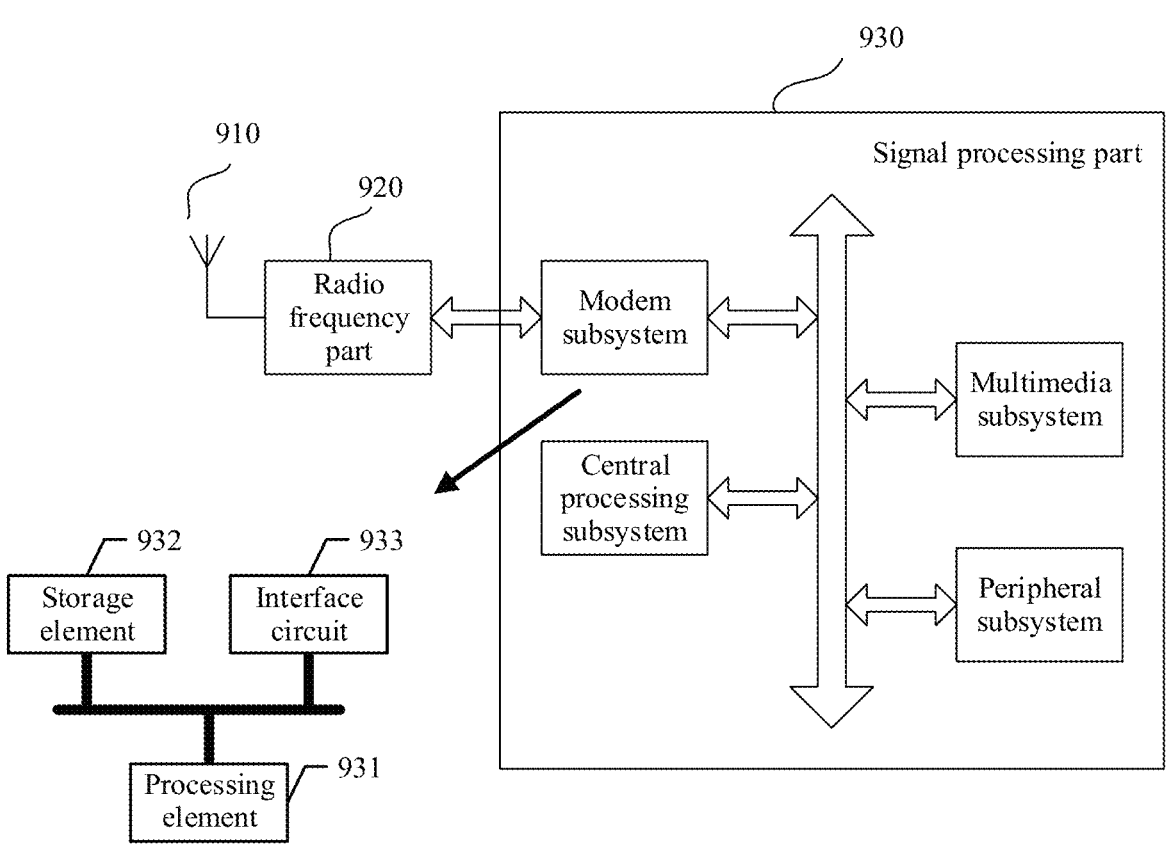
FIG. 9 is a schematic diagram of a structure of a communication apparatus according to an embodiment of this application.

FIG. 9 is a schematic diagram of a structure of a terminal device according to an embodiment of this application. The terminal device may be the terminal device in the foregoing embodiments, and may be configured to implement operations of the terminal device in the foregoing embodiments. As shown in FIG. 9, the terminal device includes an antenna 910, a radio frequency part 920, and a signal processing part 930. The antenna 910 is connected to the radio frequency part 920. In a downlink direction, the radio frequency part 920 receives, through the antenna 910, information sent by a network device, and sends, to the signal processing part 930 for processing, the information sent by the network device. In an uplink direction, the signal processing part 930 processes information of the terminal device, and sends the information to the radio frequency part 920. The radio frequency part 920 processes the information of the terminal device, and then sends the processed information to the network device through the antenna 910.

The signal processing part 930 may include a modem subsystem, configured to implement data processing at each communication protocol layer, and may further include a central processing subsystem, configured to process an operating system and an application layer of the terminal device.

The modem subsystem may include one or more processing elements 931, for example, include one main control CPU and another integrated circuit. In addition, the modem subsystem may further include a storage element 932 and an interface circuit 933. The storage element 932 is configured to store data and a program. However, a program used to perform the methods performed by the terminal device in the foregoing methods may not be stored in the storage element 932, but is stored in a memory outside the modem subsystem, and is loaded by the modem subsystem for use. The interface circuit 933 is configured to communicate with another subsystem.

The modem subsystem may be implemented by using a chip. The chip includes at least one processing element and an interface circuit. The processing element is configured to perform the operations of any method performed by the terminal device. The interface circuit is configured to communicate with another apparatus. In an implementation, units in the terminal device for implementing the operations in the foregoing methods may be implemented by a program scheduled by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another embodiment, a program used to perform the method performed by the terminal device in the foregoing methods may be in a storage element located on a different chip from the processing element, namely, an off-chip storage element. In this case, the processing element invokes or loads the program from the off-chip storage element to the on-chip storage element, to invoke and perform the method performed by the terminal device in the foregoing method embodiments.

In still another embodiment, units in the terminal device for implementing the operations in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. These integrated circuits may be integrated together to form a chip.

Units in the terminal device for implementing the operations in the foregoing methods may be integrated together, and implemented in a form of an SOC. The SOC chip is configured to implement the foregoing methods. At least one processing element and a storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by a program invoked by the processing element, and functions of some units are implemented by the integrated circuit.

It can be learned that the foregoing apparatus used in the terminal device may include at least one processing element and an interface circuit. The at least one processing element is configured to perform any one of the methods that are performed by the terminal device and that are provided in the foregoing method embodiments. The processing element may perform some or all operations performed by the terminal device, in a first manner, to be specific, by invoking the program stored in the storage element; or may perform some or all operations performed by the terminal device, in a second manner, to be specific, by using a hardware integrated logic circuit in the processing element in combination with instructions; or may certainly perform, by combining the first manner and the second manner, some or all operations performed by the terminal device.

The processing element herein is the same as that described above, and may be implemented by using a processor. A function of the processing element may be the same as a function of the processing unit described in FIG. 8. For example, the processing element may be a general-purpose processor, for example, a CPU, or may be one or more integrated circuits configured to implement the foregoing methods, for example, one or more ASICs, one or more microprocessors DSPs, one or more FPGAs, or a combination of at least two of these types of integrated circuits. The storage element may be implemented by using a memory. A function of the storage element may be the same as a function of the storage unit described in FIG. 8. The storage element may be implemented by using a memory. A function of the storage element may be the same as a function of the storage unit described in FIG. 8. The storage element may be one memory, or an umbrella term of a plurality of memories.

The terminal device shown in FIG. 9 can implement the processes related to the terminal device in the method embodiment shown in FIG. 3, FIG. 4A, FIG. 5, FIG. 6A, or FIG. 7A and FIG. 7B. Operations and/or functions of the modules in the terminal device shown in FIG. 9 are intended to implement the corresponding procedures in the foregoing method embodiments. For details, refer to the descriptions in the foregoing method embodiments. To avoid repetition, detailed descriptions are properly omitted herein.

Figure 10:
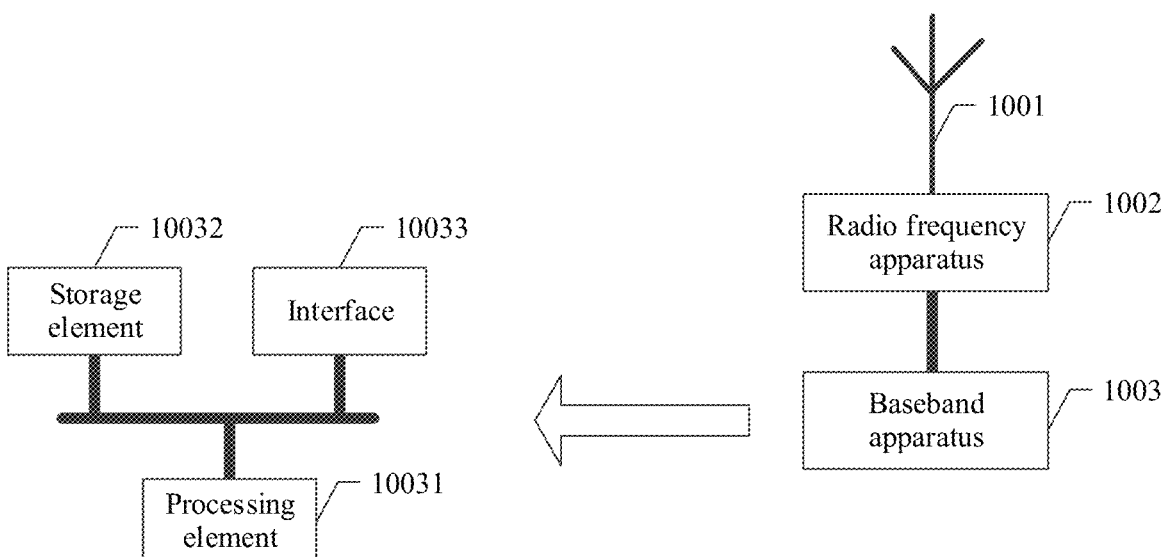
FIG. 10 is a schematic diagram of a structure of a communication apparatus according to an embodiment of this application.

FIG. 10 is a schematic diagram of a structure of a network device according to an embodiment of this application. The network device is configured to implement operations of the network device in the foregoing embodiments. As shown in FIG. 10, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, through the antenna 1001, information sent by a terminal device, and sends, to the baseband apparatus 1003 for processing, the information sent by the terminal device. In a downlink direction, the baseband apparatus 1003 processes information of the terminal device, and sends the information to the radio frequency apparatus 1002. The radio frequency apparatus 1002 processes the information of the terminal device, and then sends the processed information to the terminal device through the antenna 1001.

The baseband apparatus 1003 may include one or more processing elements 10031, for example, include a main control CPU and another integrated circuit. In addition, the baseband apparatus 1003 may further include a storage element 10032 and an interface 10033. The storage element 10032 is configured to store a program and data. The interface 10033 is configured to exchange information with the radio frequency apparatus 1002, and the interface is, for example, a common public radio interface (common public radio interface, CPRI). The foregoing apparatus used in the network device may be located in the baseband apparatus 1003. For example, the foregoing apparatus used in the network device may be a chip in the baseband apparatus 1003. The chip includes at least one processing element and an interface circuit. The processing element is configured to perform the operations of any method performed by the network device. The interface circuit is configured to communicate with another apparatus. In an implementation, units in the network device for implementing the operations in the foregoing methods may be implemented by a program scheduled by a processing element. For example, the apparatus used in the network device includes a processing element and a storage element. The processing element invokes a program stored in the storage element, to perform the methods performed by the network device in the foregoing method embodiments. The storage element may be a storage element located on a same chip as the processing element, namely, an on-chip storage element; or may be a storage element that is located on a different chip from the processing element, namely, an off-chip storage element.

In another embodiment, units in the network device for implementing the operations in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. These integrated circuits may be integrated together to form a chip.

Units in the network device for implementing the operations in the foregoing methods may be integrated together, and implemented in a form of a system-on-a-chip (SOC). For example, the baseband apparatus includes the SOC chip, and is configured to implement the foregoing methods. At least one processing element and a storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by a program invoked by the processing element, and functions of some units are implemented by an integrated circuit.

It can be learned that the foregoing apparatus used in the network device may include at least one processing element and an interface circuit. The at least one processing element is configured to perform any one of the methods that are performed by the network device and that are provided in the foregoing method embodiments. The processing element may perform some or all operations performed by the network device, in a first manner, to be specific, by invoking the program stored in the storage element; or may perform some or all operations performed by the network device, in a second manner, to be specific, by using a hardware integrated logic circuit in the processing element in combination with instructions; or may certainly perform, by combining the first manner and the second manner, some or all operations performed by the network device.

The processing element herein is the same as that described above, and may be implemented by using a processor. A function of the processing element may be the same as a function of the processing unit described in FIG. 10. For example, the processing element may be a general-purpose processor, for example, a CPU, or may be one or more integrated circuits configured to implement the foregoing methods, for example, one or more ASICs, one or more microprocessors DSPs, one or more FPGAs, or a combination of at least two of these types of integrated circuits. The storage element may be implemented by using a memory. A function of the storage element may be the same as a function of the storage unit described in FIG. 8. The storage element may be implemented by using a memory. A function of the storage element may be the same as a function of the storage unit described in FIG. 8. The storage element may be one memory, or an umbrella term of a plurality of memories.

The network device shown in FIG. 10 can implement the processes related to the network device in the foregoing method embodiments. Operations and/or functions of the modules in the network device shown in FIG. 10 are intended to implement the corresponding procedures in the foregoing method embodiments. For details, refer to the descriptions in the foregoing method embodiments. To avoid repetition, detailed descriptions are properly omitted herein.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and operations are performed on the computer or the another programmable device, so that computer-implemented processing is generated. Therefore, the instructions executed on the computer or the another programmable device provide operations for implementing a specific function in one or more processes in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A method for media stream switching by an access network device, comprising:

receiving, by the access network device of a radio access network (RAN) element, characteristic information of a first live media stream from a terminal device;

determining, by the access network device, the first live media stream, based on the characteristic information of the first live media stream, from a plurality of currently transmitted live media streams; and switching, by the access network device, a live media stream sent to the terminal device from a second live media stream to the first live media stream, wherein both the second live media stream and the first live media stream correspond to the access network device.

2. The method according to claim 1, further comprising:

determining, by the access network device, first address information corresponding to the first live media stream; and sending, by the access network device, the first address information to the terminal device, wherein the first address information is used for binding to second address information corresponding to the second live media stream.

3. The method according to claim 1, further comprising:

determining, by the access network device, first address information corresponding to the first live media stream and second address information corresponding to the second live media stream; and replacing, by the access network device, the first address information in a data packet that carries the first live media stream with the second address information.

4. The method according to claim 2, wherein determining the first address information corresponding to the first live media stream comprises:

receiving, by the access network device, a message from a session management function network element or a user plane function network element, wherein the message comprises the first address information corresponding to the first live media stream; and determining, by the access network device, the first address information corresponding to the first live media stream based on the message.

5. The method according to claim 1, wherein determining the first live media stream corresponding to the characteristic information of the first live media stream comprises:

determining, by the access network device based on the characteristic information of the first live media stream, that a second active characteristic information set comprises the characteristic information of the first live media stream; and determining, by the access network device in monitored live media streams, the first live media stream that carries the characteristic information of the first live media stream.

6. The method according to claim 5, further comprising:

determining, by the access network device based on the characteristic information of the first live media stream, that the second active characteristic information set does not comprise the characteristic information of the first live media stream; and sending, by the access network device, a response message to the terminal device to notify the terminal device that live media stream switching fails.

7. The method according to claim 5, comprising:

determining, by the access network device based on the characteristic information of the first live media stream, that the second active characteristic information set does not comprise the characteristic information of the first live media stream; and sending, by the access network device, the characteristic information of the first live media stream to an application server via a user plane function network element to request the first live media stream.

8. The method according to claim 5, further comprising:

sending, by the access network device, an establishment request message of a live session of the terminal device to a session management function network element;

receiving, by the access network device, an establishment complete message of the live session and second indication information from the session management function network element;

monitoring, by the access network device based on the second indication information, the live media stream of at least one terminal device served by the access network device; and creating the second active characteristic information set.

9. The method according to claim 8, further comprising:

sending, by the access network device, the second active characteristic information set to the terminal device.

10. The method according to claim 1, wherein the characteristic information of the first live media stream comprises a media stream parameter value of the first live media stream, or an index value uniquely corresponding to the first live media stream, and the media stream parameter value comprises a value of at least one type of parameter of a bit rate, a resolution, a frame rate, or a field of view.

11. A method of media stream switching by a terminal device, the method comprising: receiving, by the terminal device, a first active characteristic information set from a user plane function network element; determining, by the terminal device, that the first active characteristic information set comprises characteristic information of a first live media stream; sending, by the terminal device, the characteristic information of the first live media stream to an access network device of a radio access network (RAN) element; and switching, by the terminal device, a live media stream received from the access network device from a second live media stream to the first live media stream, wherein both the second live media stream and the first live media stream correspond to the access network device.

12. The method according to claim 11, wherein before sending the characteristic information of the first live media stream to an access network device, the method further comprises:

sending, by the terminal device, an establishment request message of a live session to a session management function network element via the access network device;

receiving, by the terminal device from the session management function network element via the access network device, an establishment complete message and an initial characteristic information set for a live service, wherein the initial characteristic information set comprises characteristic information of live media streams corresponding to various media stream parameters; and determining, by the terminal device in the initial characteristic information set, the characteristic information of the first live media stream corresponding to current media stream parameter information.

13. The method according to claim 11, wherein before sending the characteristic information of a first live media stream to an access network device, the method further comprises:

receiving, by the terminal device, a second active characteristic information set from the access network device; and determining, by the terminal device, that the second active characteristic information set comprises the characteristic information of the first live media stream.

14. The method according to claim 11, further comprising:

receiving, by the terminal device, first address information corresponding to the first live media stream;

binding, by the terminal device, the first address information corresponding to the first live media stream to second address information corresponding to the second live media stream; and parsing the first live media stream based on a binding relationship.

15. A terminal device, comprising: a processor; and a memory coupled to the processor and storing instructions, which when executed by the processor, cause the processor to perform operations of switching media streams, the operations comprising: receiving a first active characteristic information set from a user plane function network element; determining that the first active characteristic information set comprises characteristic information of a first live media stream; sending the characteristic information of the first live media stream to an access network device of a radio access network (RAN) element; and switching a live media stream received from the access network device from a second live media stream to the first live media stream, wherein both the second live media stream and the first live media stream correspond to the access network device.

16. The terminal device according to claim 15, wherein before sending the characteristic information of the first live media stream to an access network device, the operations further comprise:

sending an establishment request message of a live session to a session management function network element via the access network device;

receiving, from the session management function network element via the access network device, an establishment complete message and an initial characteristic information set for a live service, wherein the initial characteristic information set comprises characteristic information of live media streams corresponding to various media stream parameters; and determining, in the initial characteristic information set, the characteristic information of the first live media stream corresponding to current media stream parameter information.

17. The terminal device according to claim 15, wherein before sending the characteristic information of a first live media stream to an access network device, the operations further comprise:

receiving a second active characteristic information set from the access network device; and determining that the second active characteristic information set comprises the characteristic information of the first live media stream.

18. The terminal device according to claim 15, wherein the operations further comprise:

receiving first address information corresponding to the first live media stream;

binding the first address information corresponding to the first live media stream to second address information corresponding to the second live media stream; and parsing the first live media stream based on a binding relationship.

\* \* \* \* \*